United States Patent
Vander Sluis et al.

(10) Patent No.: US 8,382,183 B2
(45) Date of Patent: Feb. 26, 2013

(54) SPINE MEMBER AND ACCESSORY MODULE APPARATUS

(75) Inventors: Daniel R. Vander Sluis, Rochester Hills, MI (US); Robert C. Fitzpatrick, Holland, MI (US)

(73) Assignee: Faurecia Interior Systems, Inc., Auburn Hills, MI (US)

( * ) Notice: Subject to any disclaimer, the term of this patent is extended or adjusted under 35 U.S.C. 154(b) by 95 days.

(21) Appl. No.: 12/428,499

(22) Filed: Apr. 23, 2009

(65) Prior Publication Data

US 2009/0267375 A1     Oct. 29, 2009

Related U.S. Application Data

(60) Provisional application No. 61/047,866, filed on Apr. 25, 2008.

(51) Int. Cl.
*B60R 11/06* (2006.01)
(52) U.S. Cl. ...................................... 296/37.8
(58) Field of Classification Search ................. 296/37.8, 296/214, 37.7; 606/279, 247, 246, 70; 361/679.56; 623/17.13, 17.15, 17.11, 17.16; 248/311.2
See application file for complete search history.

(56) References Cited

U.S. PATENT DOCUMENTS

| | | | |
|---|---|---|---|
| 2,148,401 A | 2/1939 | Ellis, Jr. | |
| 3,120,308 A | 2/1964 | Pierro | |
| 5,085,481 A * | 2/1992 | Fluharty et al. | 296/37.8 |
| 5,106,143 A | 4/1992 | Soeters | |
| 5,112,094 A | 5/1992 | Kribs | |
| 5,180,089 A | 1/1993 | Suman et al. | |
| 5,338,081 A | 8/1994 | Young et al. | |
| 5,951,084 A * | 9/1999 | Okazaki et al. | 296/37.16 |
| 6,135,529 A * | 10/2000 | De Angelis et al. | 296/37.8 |
| 6,203,088 B1 * | 3/2001 | Fernandez et al. | 296/37.8 |
| 6,264,261 B1 * | 7/2001 | Krafcik | 296/37.8 |
| 6,267,217 B1 | 7/2001 | Malone et al. | |
| 6,267,428 B1 | 7/2001 | Baldas et al. | |
| 6,338,517 B1 | 1/2002 | Canni et al. | |
| 6,386,629 B1 * | 5/2002 | Severinski et al. | 297/188.1 |
| 6,419,314 B1 * | 7/2002 | Scheerhorn | 297/188.19 |
| 6,435,587 B1 | 8/2002 | Flowerday et al. | |
| 6,575,528 B2 | 6/2003 | Tiesler et al. | |
| 6,669,260 B2 | 12/2003 | Clark et al. | |
| 6,719,367 B2 * | 4/2004 | Mic et al. | 297/188.19 |
| 6,726,267 B2 * | 4/2004 | Kim et al. | 296/24.34 |
| 6,789,832 B2 | 9/2004 | Gort et al. | |
| 6,824,185 B2 | 11/2004 | Tiesler et al. | |

(Continued)

FOREIGN PATENT DOCUMENTS

| CA | 824569 A | 10/1969 |
|---|---|---|
| DE | 19737739 A1 | 3/1999 |

(Continued)

OTHER PUBLICATIONS

International Search Report and Written Opinion for corresponding PCT application PCT/US2009/041479, Jun. 16, 2009.

(Continued)

*Primary Examiner* — Kiran B Patel
(74) *Attorney, Agent, or Firm* — Reising Ethington P.C.

(57) ABSTRACT

A console apparatus for use in a vehicle that secures additional optional accessories that function to provide storage space for personal items, food and liquids, and/or and armrest, the apparatus including one or more accessory modules and a spine member for receiving, securing and reducing the jostling or shifting of one or more accessory modules by a person or the motions of a moving vehicle.

12 Claims, 22 Drawing Sheets

U.S. PATENT DOCUMENTS

| | | | |
|---|---|---|---|
| 6,921,118 B2 * | 7/2005 | Clark et al. | 296/24.34 |
| 7,156,438 B2 * | 1/2007 | Cowelchuk et al. | 296/24.34 |
| 7,401,831 B2 * | 7/2008 | Sturt | 296/37.8 |
| 7,416,235 B2 * | 8/2008 | Rajappa et al. | 296/37.8 |
| 7,445,261 B2 * | 11/2008 | Joler et al. | 296/24.34 |
| 7,530,615 B2 * | 5/2009 | Ogura | 296/24.34 |
| 7,543,874 B2 * | 6/2009 | Ogura et al. | 296/37.8 |
| 7,591,498 B2 * | 9/2009 | Busha et al. | 296/24.34 |
| 7,766,408 B2 * | 8/2010 | Lota et al. | 296/37.1 |
| 7,802,833 B2 * | 9/2010 | Boreanaz et al. | 296/24.34 |
| 7,883,146 B2 * | 2/2011 | Saberan et al. | 297/188.21 |
| 2002/0043603 A1 | 4/2002 | Thomas | |
| 2003/0127878 A1 | 7/2003 | Gort | |
| 2005/0134072 A1 | 6/2005 | Sturt | |
| 2006/0113810 A1 | 6/2006 | Kuhl | |
| 2006/0186155 A1 | 8/2006 | Quijano et al. | |
| 2007/0069541 A1 | 3/2007 | Sturt | |
| 2007/0075107 A1 * | 4/2007 | Brancheriau et al. | 224/281 |
| 2007/0152461 A1 | 7/2007 | Joler et al. | |
| 2009/0058120 A1 * | 3/2009 | Ioka et al. | 296/24.34 |
| 2010/0201147 A1 * | 8/2010 | Jones et al. | 296/24.34 |

FOREIGN PATENT DOCUMENTS

| | | |
|---|---|---|
| DE | 19808380 | 9/1999 |
| DE | 19909732 | 9/2000 |
| DE | 102005003877 A1 | 7/2006 |
| EP | 1873014 | 1/2008 |
| EP | 1873015 A | 1/2008 |
| ES | 2195746 A1 | 12/2003 |

OTHER PUBLICATIONS

International Preliminary Report on Patentability for corresponding PCT application PCT/US2009/041479, Oct. 26, 2010.

Supplementary European Search Report for EP09735872, Nov. 23, 2012, 6 pages.

* cited by examiner

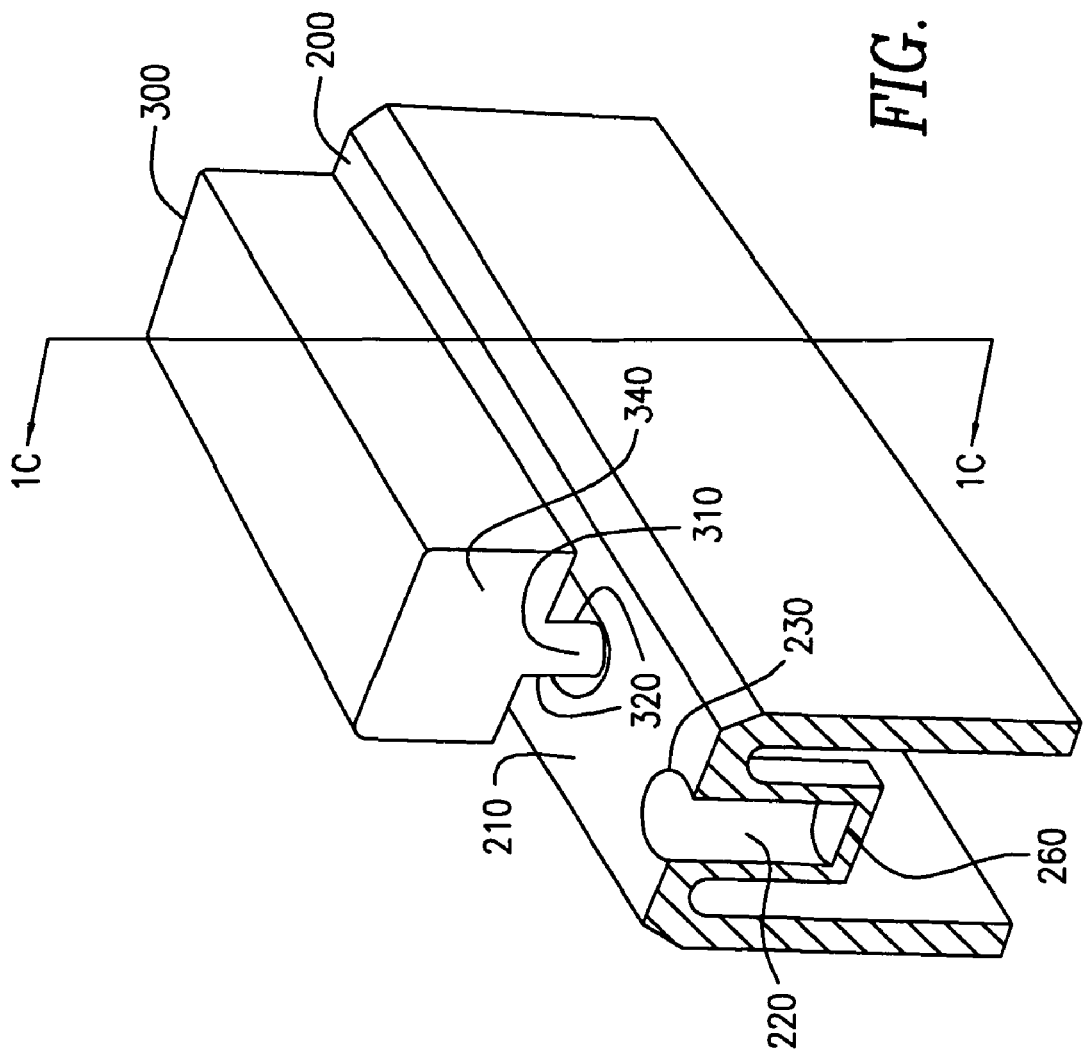
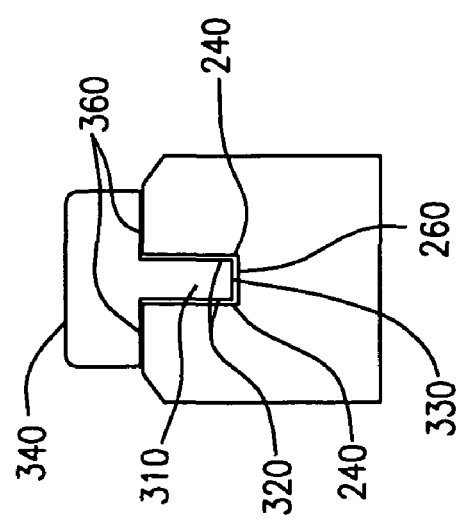
FIG. 1B
FIG. 1C

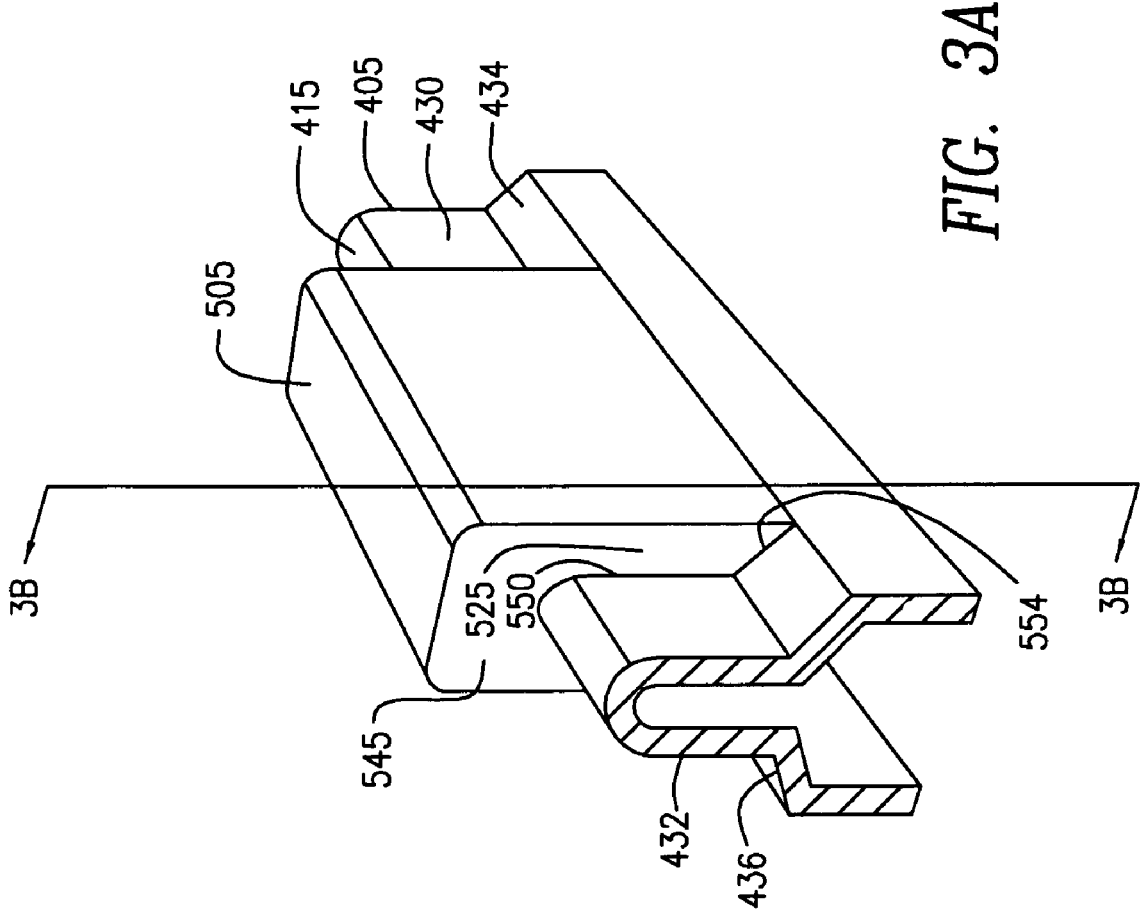
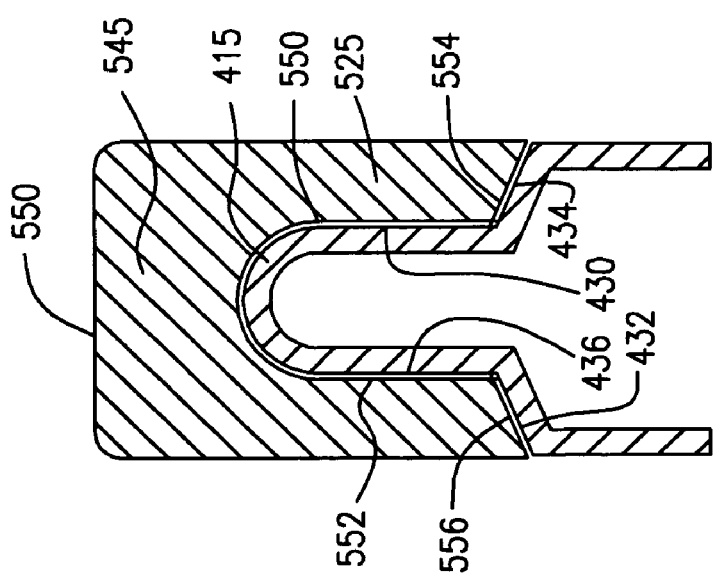

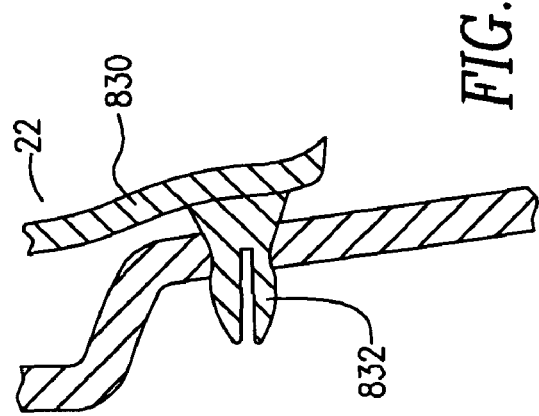
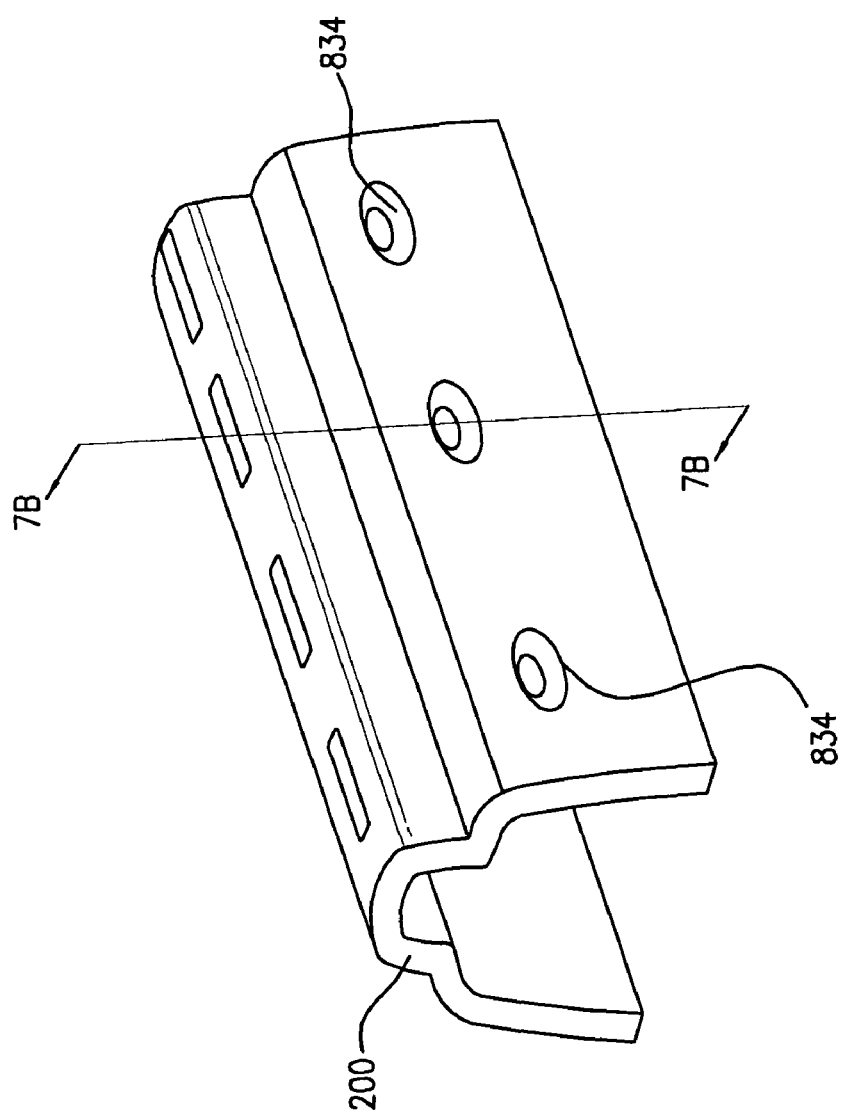

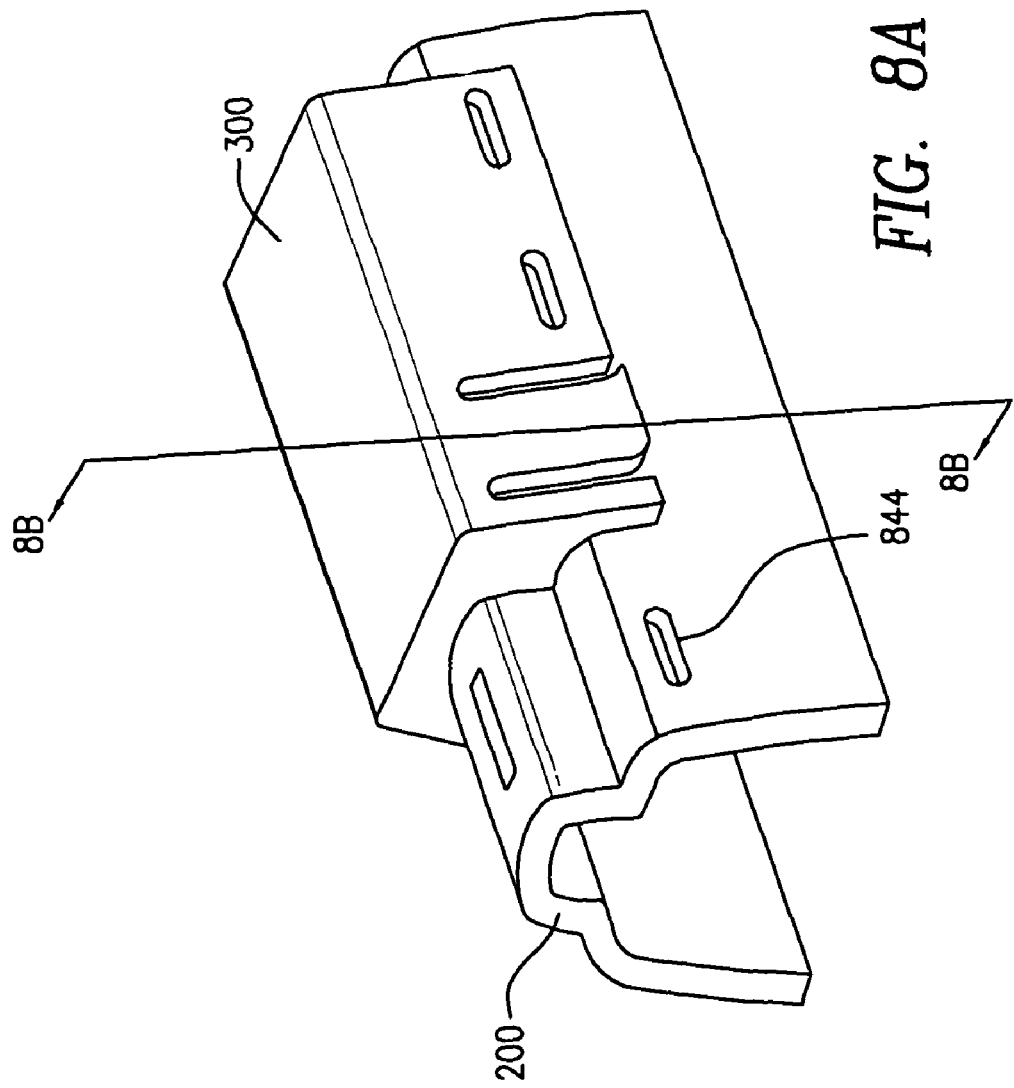
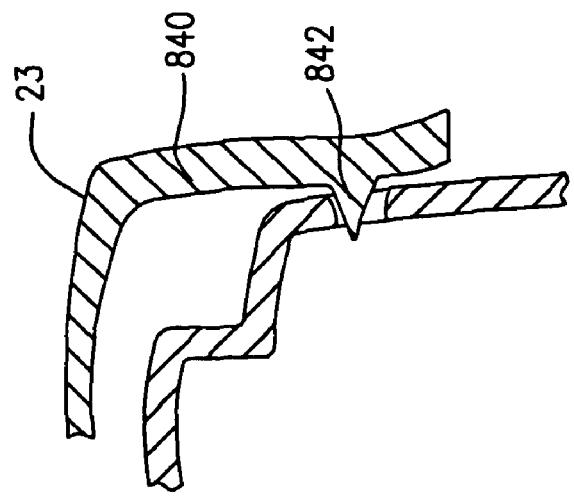
FIG. 8A
FIG. 8B

SPINE MEMBER AND ACCESSORY MODULE APPARATUS

CROSS-REFERENCE TO RELATED APPLICATIONS

This application claims the benefit of U.S. Provisional Patent Application No. 61/047,866, filed Apr. 25, 2008, the entirety of which is incorporated herein by reference.

BACKGROUND

Vehicle consoles are usually located between the driver and passenger seats. In most, if not all, vehicles the console typically employs a number of standard features such as the gear shift knob and the handbrake lever. In upscale vehicles, the console may also employ additional features including a center console compartment and armrest, hinged and/or sliding components for opening and closing storage bins or compartments within the console, one or more cup-holders, and/or power and signal connections for portable electronic devices. To keep the cost of manufacture low for lower scale and/or entry-level vehicles, automakers typically provide consoles that are sparse and lack many of these additional features. Thus, a user of the lower scale and/or entry-level vehicle typically must endure a spartan console that lacks desirable amenities.

Furthermore, users usually differ on their use of the various console features. For example, users that do not drink while in a vehicle may find the cup-holders less useful than a different console feature, such as a storage compartment. Alternatively, some users may find the console storage compartments and/or armrest to be too constricting and uncomfortable and would prefer to keep console features to a minimum. Additionally, users that prefer a cup-holder may find that the position of the cup-holder may not be ideal given the users' body shapes and sizes. For example, a cup within the cup-holder may obstruct access to the gear shift knob and/or handbrake, requiring the user to twist or maneuver their arm in an awkward and potentially unsafe fashion in order to reach the cup and/or the gear shift knob.

Providing ergonomic characteristics and utilizing simpler arm movements are important for effective and comfortable user interaction within the vehicle. Awkward and uncomfortable movements of the user can result in inefficient operation, and can place a driver and passengers into distracting, unsafe situations, which can result in accidents, injury, or the like.

Therefore, there is a need in the art for a console that is cost-effective for the manufacturer and provides adaptable ergonomic characteristics and preferences to a user.

SUMMARY OF THE INVENTION

One or more embodiments of the present invention provide a console apparatus that employs a console spine member designed to receive and secure one or more accessory modules thereto in a way that keeps manufacturing costs low, yet provides flexibility in the number, location, and type of accessories available to the user.

An important consideration of the console apparatus of the present invention is the cost associated with manufacturing a vehicle employing the console apparatus. The only element of the console apparatus that may be required to be provided by the manufacturer is the spine member. Therefore, the cost to the manufacturer for manufacturing a vehicle employing the console apparatus would potentially be significantly lower compared to the cost of manufacturing a vehicle having a console that employs additional features. Additionally, the manufacturer would have the potential to make additional sales by manufacturing and selling the various accessory modules that can be connected to the spine member. In fact, the manufacturer has a potential to make additional sales for many years after the initial sale of the vehicle by designing and manufacturing accessory modules with new and different features.

The console may be adapted to the user's preference by adding to the spine member such accessory modules as storage compartments, storage containers, cup-holders, an armrest, power and/or signal connections, a docking station for personal electronic devices and/or other accessories. The accessory modules may be positioned along the spine member according to the user's preference. For instance, a cup-holder accessory module may be placed along the spine member that allows the user to easily and safely reach the cup. Accessory modules may be designed so that they smoothly integrate to each other when they are placed immediately adjacent and abut each other when connected along the spine member. It is contemplated that the accessory module may be situated above, to the side or below the upper surface of the spine member.

In accordance with one or more embodiments of the present invention, a console apparatus includes: a spine member having an upper surface, extending in a longitudinal direction, upon which is disposed a plurality of spaced apart receptacles and their respective apertures; and at least one user accessory module having at least one protrusion. The console apparatus operates to: form a secure and snug connection between at least one protrusion and one or more receptacle such that the protrusion is sized and shaped to couple to, and be received within one or more of the plurality of receptacles; and allows the user to position the user accessory module along any longitudinal position of the spine member depending upon the user's preference.

The spine member is operable to provide a stationary and secure anchor point so that the at least one user accessory module can be attached and will not move or become loose with the continued jostling and movement of the vehicle. The protrusion is sized and shaped to conform to the receptacle in such a manner as to provide the tight and snug fit. The tight and snug fit conformation is designed to comply with or exceed the load bearing tolerances in accordance with regulatory standards. In some applications, the user accessory module may be easily removed and re-attached by a user without the need of special tools.

Alternatively or additionally, the receptacle and the protrusion are further secured by a fastening mechanism which may be in the form of a push-nut assembly and operates by fastening the bottom surfaces of the protrusion and receptacle together by a shaft, the shaft having a first deformable stop member and a second stop member. When the protrusion is placed in the receptacle, the shaft and deformable stop member is forced through the aperture of either the protrusion exterior bottom surface or the receptacle interior bottom surface and is held snugly in place by the first deformable stop member and the second stop member until the user desires to detach the accessory module by pulling loose the protrusion by providing sufficient force to pull the shaft and deformable stop member back through the aperture.

In accordance with one or more embodiments of the present invention, a console apparatus includes: a spine member having an upper surface, extending in a longitudinal direction, and at least first and second opposing side surfaces extending transversely from the upper surface; and at least one user accessory module having at least one cavity, the cavity having at least first and second opposing side surfaces that are sized and shaped to engage the respective first and second opposing side surfaces of the spine member. The console apparatus operates to: form a secure and snug connection between first and second opposing side surfaces of the spine member and the first and second opposing side surfaces of the cavity; and to allow a user to place the user accessory module along any longitudinal position of the spine member depending upon the user's preference. The cavity is sized and shaped to conform to the first and second opposing side surfaces of the spine member in such a manner as to provide a tight and snug fit that resists the continued jostling, vibration and movement of the vehicle, and can be easily pulled apart by a user. The tight and snug fit conformation is designed to comply with or exceed the load bearing tolerances in accordance with regulatory standards.

It is contemplated that a third and fourth opposing side surface may extend transversely from the first and second opposing side surfaces, respectively. For example, the first and second opposing side surfaces of the spine member may be exactly or nearly perpendicular to the upper surface of the spine member, and the third and fourth opposing side surfaces extend at a different angle from the first and second opposing side surfaces, for instance at a 45 degree angle to the upper surface of the spine member. The cavity is sized and shaped to conform to the first, second, third and fourth opposing side surfaces of the spine member in a way that contact with these multiple opposing side surfaces function together to further enhance the stability of the user accessory module. It is also contemplated that more than four opposing side surfaces may be implemented.

Alternatively or additionally, the connection between the upper surface and the first and second opposing side surfaces of the spine member may be rounded or slightly angled. Such a rounded or slightly angled connection functions to improve the connection with the user accessory module. Furthermore, the rounded connection functions to create a more comfortable surface along the spine member when no user accessory module is connected.

Alternatively or additionally, the cavity and the side surfaces are further secured by a fastening mechanism which may be in the form of a push-nut assembly, a screw assembly such as a quarter turn screw, a tether assembly, a snap closure assembly or a buckle assembly and operates to fasten the user accessory module and the spine member together until the user desires to disengage the accessory module by pulling loose or undoing the fastener.

Alternatively or additionally, the spine member may be arched in a longitudinal direction in a plane perpendicular relative to a horizontal reference plane so that at least a section of the spine member is raised relative to a different section. For example, the section of the spine member closest to the front of the vehicle may be lower, and thus out of the way of the gear shift knob, and then raised higher as the spine member extends along the longitudinal direction to the rear of the vehicle. It is contemplated that the rear section of the spine member is raised to a suitable height for allowing a user to comfortably rest his/her arm on the spine member, with or without an accessory module.

It is further contemplated that the raised section of the arched spine member provides additional storage space or other function between the spine member and the base of the console. For example, additional storage containers in the base of the console are easily accessible by a user when the spine member is raised.

It is also contemplated that the spine member may extend in the longitudinal direction in a curvilinear manner such that the spine member exits a plane perpendicular to a substantially horizontal reference plane so that the orientation of the spine member is asymmetrical. Such an asymmetrical orientation is advantageous when the spine member is to curve around a console feature such as a handbrake lever or gear shift knob, to provide additional storage area, or to improve aesthetic.

It is also contemplated that the spine member may provide a power and/or signal connection for various electronic devices. Through the use of conductors and terminals, the power and/or signal connection may be located on the spine member itself or the accessory module. For example, a portable music device may be connected to a vehicle sound system and charged by docking the portable music device in the accessory module that is a docking station having both a power and signal connection. Other electronic devices that may be connected in this manner include, but are not limited to cellular telephones, GPS navigation devices, notebook computers, portable data storage devices, electronic books and digital cameras.

Alternatively or additionally, the spine member may be integrated into the existing console. For example, the front section of the spine member may be integrated into a handbrake lever housing, a gear shift housing, an existing storage compartment or other console feature.

Other aspects, features, advantages, etc. will become apparent to one skilled in the art when the description of the invention herein is taken in conjunction with the accompanying drawings.

BRIEF DESCRIPTION OF THE DRAWINGS

For the purposes of illustration, there are forms shown in the drawings that are presently preferred, it being understood, however, that the invention is not limited to the precise arrangements and instrumentalities shown.

FIG. 1B is a close-up perspective view of a connection mechanism between the spine member and the accessory module of FIG. 1A.

FIG. 1C is a cross-sectional view taken through line 1C-1C of the apparatus of FIG. 1B.

FIG. 3A is a perspective view of an alternative connection mechanism between the spine member and the accessory module in accordance with at least one further aspect of the present invention.

FIG. 3B is a cross-sectional view taken through line 3B-3B of the apparatus of FIG. 3A.

FIG. 7A is a perspective view of an alternative spine member having a tether fastening assembly in accordance with at least one further aspect of the present invention.

FIG. 7B is a cross-sectional view taken through line 7B-7B of the spine member of FIG. 7A.

FIG. 8A is a perspective view of an alternative console apparatus having a snap closure fastening assembly in accordance with at least one further aspect of the present invention.

FIG. 8B is a cross-sectional view taken through line 8B-8B of the spine member and the accessory module of FIG. 8A.

DETAILED DESCRIPTION OF THE PRESENT INVENTION

For the purposes of describing various aspects of the present invention, reference may be made to using a console apparatus in a Y-O center console of a vehicle. It will be appreciated by those skilled in the art, however, that the various embodiments of the console apparatus described and claimed herein may have application to many other areas, including the center section of the rear passenger seats, various consoles located in other vehicles including trucks, vans, semi-truck, buses, boats, motor vehicle, or the like.

In particular, the console apparatus of the present invention is directed to reducing the manufacturing costs to an automaker, and providing a user with additional options to outfit the vehicle console according to his or her preference.

Figure 1A:
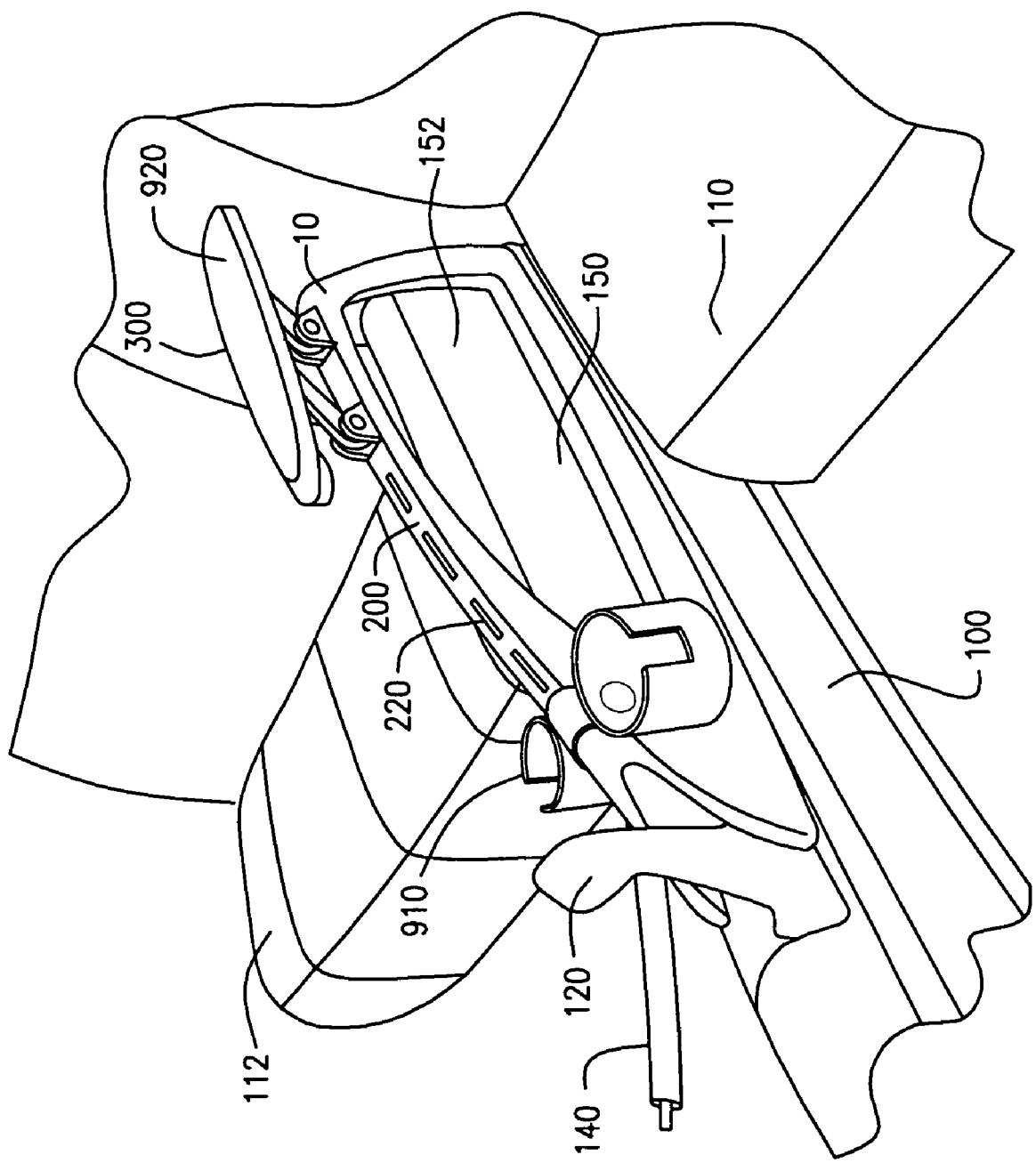
FIG. 1A is a perspective view of a console apparatus integrated with a vehicle console in accordance with at least one aspect of the present invention.

FIG. 1A is a perspective view of a console apparatus 10 integrated with a vehicle console 100 in accordance with at least one aspect of the present invention. As depicted, the console apparatus 10 includes a spine member 200 and accessory modules 300. The console apparatus 10 is arched wherein the spine member 200 extends in the longitudinal direction in a plane perpendicular to a substantially horizontal reference plane and is arched in the longitudinal direction relative to the horizontal reference plane. The rearward section of the spine member 200 is higher relative to the forward section of the spine member 200, and arches downward towards the base of a gear shift knob 120 and also to partially wrap around the gear shift knob 120 so as to reduce any obstruction to the gear shift knob 120 by a user. The rearward section of the console apparatus 10 is raised which operates to provide a sufficient height for the optional armrest accessory module 920 or other accessory module 300 to be used. The accessory modules 300 are snugly held in place on the spine member 200 by utilizing a protrusion and receptacle connecting assembly which will be discussed below.

Reference is now made to FIGS. 1B and 1C, where FIG. 1B is a close-up perspective view of a connection mechanism between the spine member 200 and the accessory module 300 of FIG. 1A, and FIG. 1C is a cross-sectional view taken through line 1C-1C of the apparatus 10 of FIG. 1B. As shown, the spine member 200 further includes an upper surface 210 having multiple receptacles 220 opening at corresponding apertures 230. One or more of the receptacles 220 have an interior side wall surface 240 and an interior bottom surface 260. The accessory module 300 includes at least one protrusion 310, which may be solid or hollow, and an accessory portion 340. In this embodiment the accessory portion 340 is an armrest. The accessory portion 340 includes a bottom facing surface 360 from which the protrusion 310 extends. The protrusion 310 includes an exterior side wall surface 320 and an exterior bottom surface 330. A tight and snug connection of the accessory module 300 to the spine member 200 results by inserting the protrusion 310 into the receptacle 220. An accessory module 300 that extends over more than one receptacle 220 may include more than one protrusion 310 so that each protrusion 310 is inserted into a receptacle 220 and functions to provide additional stability and snugness over the length of the accessory module 300. For example, the armrest 920 is depicted with two protrusions 310, each protrusion inserted into a corresponding receptacle 220.

The accessory module 300 is connected to the spine member 200 by inserting the one or more protrusions 310 into corresponding ones of the receptacles 220. The side surface 320 and an exterior bottom surface 330 of the protrusion 310 are sized and shaped to fit into the receptacle 220 and directly contact the interior side wall surface 240 and/or interior bottom surface 260 of the receptacle 220 creating a tight and snug fit. The bottom facing surface 360 of the accessory portion 340 is sized and shaped to conform to the upper surface 210 of the spine member 200. The tight and snug fit between the various surfaces of the accessory module 300 and spine member 200 reduce any shifting or jostling of the accessory module 300 while the vehicle is in motion, and also stabilizes and centers the accessory module 300 on the spine member 200 and prevents the accessory module 300 from tipping, leaning or favoring one side. The tight and snug fit also prevents shifting or sliding when a user applies pressure and force on the accessory module 300. For example, when the accessory module 300 is an armrest 920 and the user applies pressure when resting his or her elbow on the accessory module 300, the tight and snug fit of the various surfaces resists the shifting of the accessory module 300 in an opposite direction to the pressure.

To disengage the accessory module 300 from the spine member 200, a user would simply lift off the accessory module 300 by applying sufficient force to separate and break the tight and snug fit of the various surfaces discussed above. Thus, any of a plurality of user-definable positions of the accessory module 300 along the spine member 200 may be achieved.

Referring again to FIG. 1A, the console apparatus 10 may be integrated with the Y-O center console 100 of a vehicle, which is located between the two front seats 110 and 112 of a vehicle. Typically, the gear shift knob 120 and handbrake lever 140 are situated along the Y-O center console 100. The arched console apparatus 10 may include an area below the spine member 200 having an open bottom 150 with a soft storage container 152. As shown, the open bottom 150 provides additional storage space that is integrated, in part, with the center console 100. Various accessory modules 300 including a dual cup-holder 910 and an adjustable armrest 920 are also shown connected to the spine member 200.

Figure 2A:
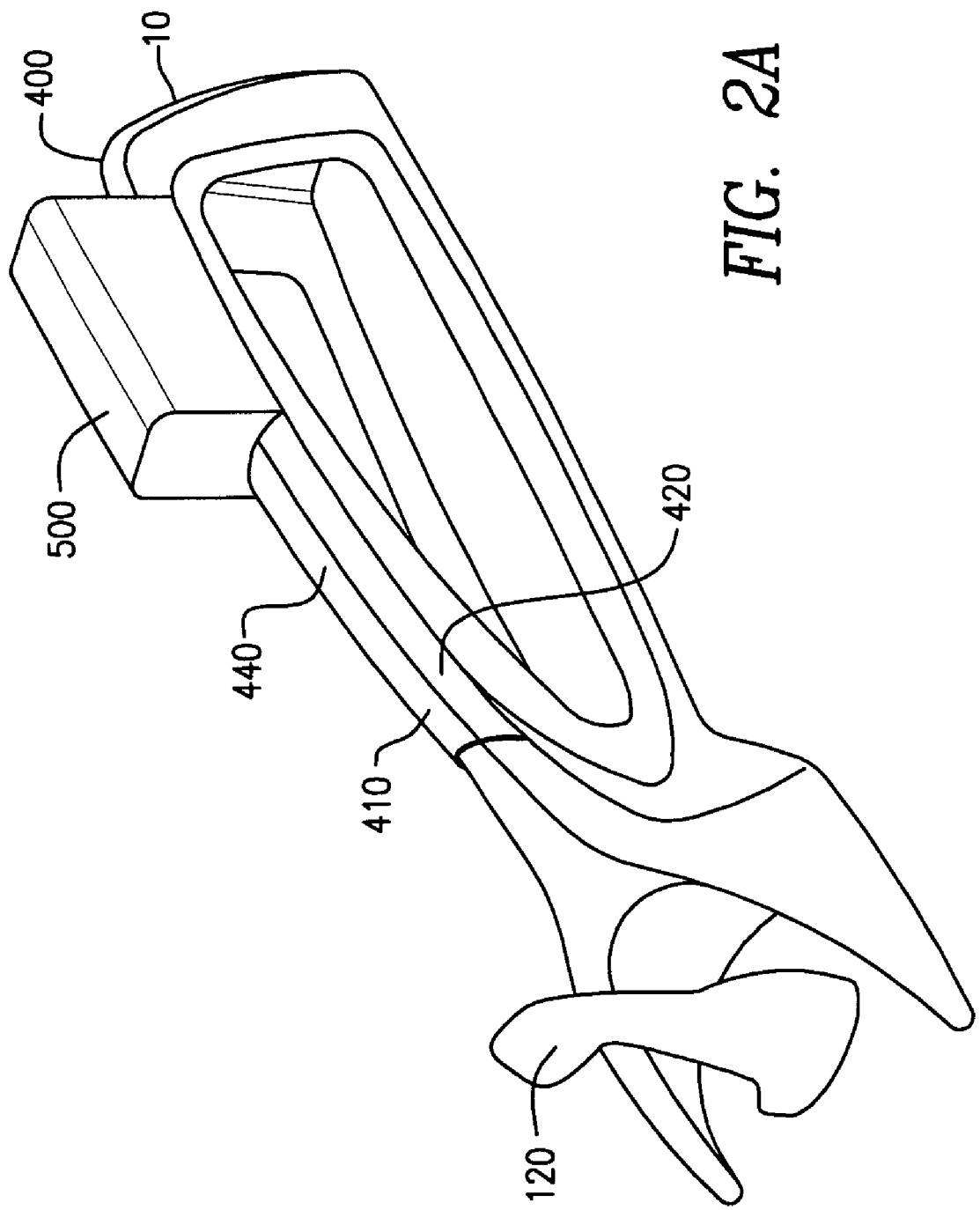
FIG. 2A is a perspective view of a console apparatus integrated with a vehicle console in accordance with at least one aspect of the present invention.

Reference is now made to FIG. 2A, which is a perspective view a second embodiment of the console apparatus 10 integrated with a vehicle console 100 in accordance with at least one further aspect of the present invention. The console apparatus 10 is shown with a spine member 400 including an upper surface 410 and first and second opposing side surfaces 420 and 422 extending transversely from the upper surface 410. At least one accessory module 500 can be snugly held in place on the spine member 500 by utilizing a cavity 520 (FIG. 2B) shaped and sized to conform to the upper surface 410 and first and second opposing side surfaces 420 and 422 of the spine member 400.

Figures 2B, 2C:
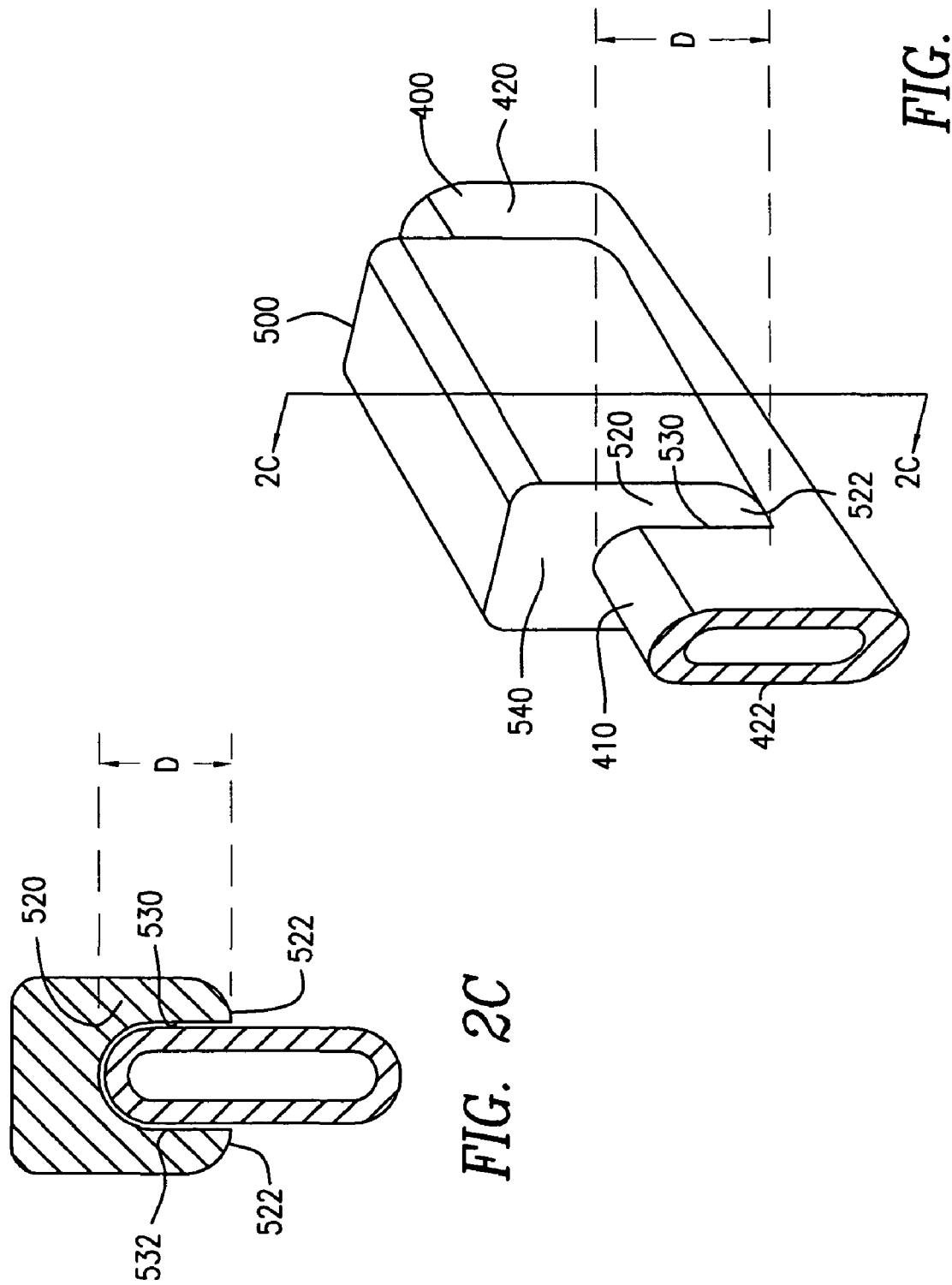
FIG. 2B is a close-up perspective view of a connection mechanism between the spine member and the accessory module of FIG. 2A.
FIG. 2C is a cross-sectional view taken through line 2C-2C of the apparatus of FIG. 2B.

Reference is now made to FIGS. 2B and 2C, where FIG. 2B is a close-up perspective view of a connection mechanism between the spine member 400 and the accessory module 500 of FIG. 2A, and FIG. 2C is a cross-sectional view taken through line 2C-2C of the apparatus 10 of FIG. 2B. As shown, the upper surface 410 is rounded transverse to the longitudinal direction, and smoothly joins the first and second opposing side surfaces 420 and 422. The accessory module 500 includes the cavity 520 and an accessory portion 540. In this embodiment, the accessory portion 540 is an armrest. The cavity 520 further includes first and second inwardly opposing side surfaces 530 and 532 that are sized and shaped to conform to the upper surface 410 and the first and second opposing side surfaces 420 and 422 of the spine member 400.

The accessory module 500 is connected to the spine member 400 by placing the cavity 520 over the spine member 400 and applying downward pressure to push the cavity 520 around the spine member 400. In the connected orientation, the first and second inwardly opposing side surfaces 530 and 532, which are sized and shaped to conform to the spine member 400, are in direct contact with the upper surface 410, and first and second opposing side surfaces 420 and 422 creating a tight and snug fit.

It is contemplated that the accessory module 500 further includes lateral edges 522 along the cavity 520 that may be slightly inwardly angled such that the first and second inwardly opposing side surfaces 530 and 532 are slightly pushed apart as the cavity 520 is forced over the spine member 400. The optimal slightly inward angle needed to create enough pressure to increase the snug fit may be determined by a skilled artisan.

The tight and snug fit created by the contact between the upper surface 410 and the first and second opposing side surfaces 420 and 422 and first and second inwardly opposing side surfaces 530 and 532 contributes to stabilize and center the accessory module 500 on the spine member 400 and prevents the accessory module 500 from tipping, leaning or favoring one side. The depth, D, of the cavity 520, defined as the distance from the lateral edge 522 to the innermost point of the cavity 520, can be varied depending upon the stabilizing requirements of the particular accessory module 500. A greater depth, D, results in greater surface contact between the accessory module 500 and the spine member 400, which, in turn, functions to provide greater stability. For example, an accessory module 500 that is an armrest benefits from a greater depth because it provides greater stability to compensate for the pressure exerted on the armrest by a user.

To remove the accessory module 500 from the spine member 400, a user would simply lift off the accessory module 500 by applying sufficient force to separate and break the tight and snug fit of the various surfaces discussed above. Again, this enables a number user-definable or manufacturer-definable configurations.

Referring again to FIG. 2A, the console apparatus 10 may have an open bottom 150. As shown, the console apparatus 10 is depicted to arch downward towards the base of the gear shift knob 120 and also to partially wrap around the gear shift knob 120 so as to reduce any obstruction to the gear shift knob 120 by a user. The arch of the console apparatus 10 further functions to provide a sufficient height for an armrest 920 or other accessory module 300 to be connected. It is contemplated that the spine member 400 may be covered with a covering/trim 440 made of one or more materials known to a skilled artisan, including but not limited to leather, fabric, rubber, silicone, plastic, plastic resin or other synthetic flexible material, that creates a tacky-like or non-slip surface so as to improve the connection between the accessory module 500 and the spine member 400.

FIGS. 3A-3B depict an alternative connection mechanism between the spine member 400 and the accessory module 500, where FIG. 3A is a perspective view thereof and FIG. 3B is a cross-sectional view taken through line 3B-3B of the apparatus of FIG. 3A. As shown, a spine member 405 includes an upper surface 415, and first and second opposing side surfaces 430 and 432 extending transversely from the upper surface 415, and third and fourth opposing side surfaces 434 and 436 extending transversely from the first and second opposing side surfaces 430 and 432, respectively. An accessory module 505 includes a cavity 525 and an accessory portion 545. In this embodiment the accessory portion 545 is an armrest. The cavity 525 includes first and second inwardly opposing side surfaces 550 and 552 that are sized and shaped to conform to the upper surface 415 and the first and second opposing side surfaces 430 and 432 of the spine member 405. The cavity 525 further includes third and fourth opposing side surfaces 554 and 556 extending transversely from the first and second inwardly opposing side surfaces 550 and 552, respectively. The third and fourth opposing side surfaces 554 and 556 are sized and shaped to conform to the third and fourth opposing side surfaces 434 and 436 of the spine member 405, respectively. Contact between the additional third and fourth surfaces further contributes to the stabilizing and centering effects by the first and second surfaces on the accessory module 505 and the spine member 405 because the exerted pressures and forces on the accessory module 505 from the moving vehicle and/or user are distributed over a greater surface area and different surface angles. In this manner, more pressure and force may be exerted on the console apparatus 10 before disengagement or shifting of the accessory module 505 results.

The accessory module 505 is connected to the spine member 405 by placing the cavity 525 over the spine member 405 and applying downward pressure to push the cavity 525 around the spine member 405. In the connected orientation, the first and second inwardly opposing side surfaces 550 and 552, and the third and fourth opposing side surfaces 554 and 556, are in direct contact with the upper surface 415, and first, second, third and fourth opposing side surfaces 430, 432, 434 and 436, creating a tight and snug fit.

To remove the accessory module 505 from the spine member 405, a user would simply lift off the accessory module 505 by applying sufficient force to separate and break the tight and snug fit of the various surfaces discussed above. Again, this enables a number user-definable or manufacturer-definable configurations.

Figure 4A:
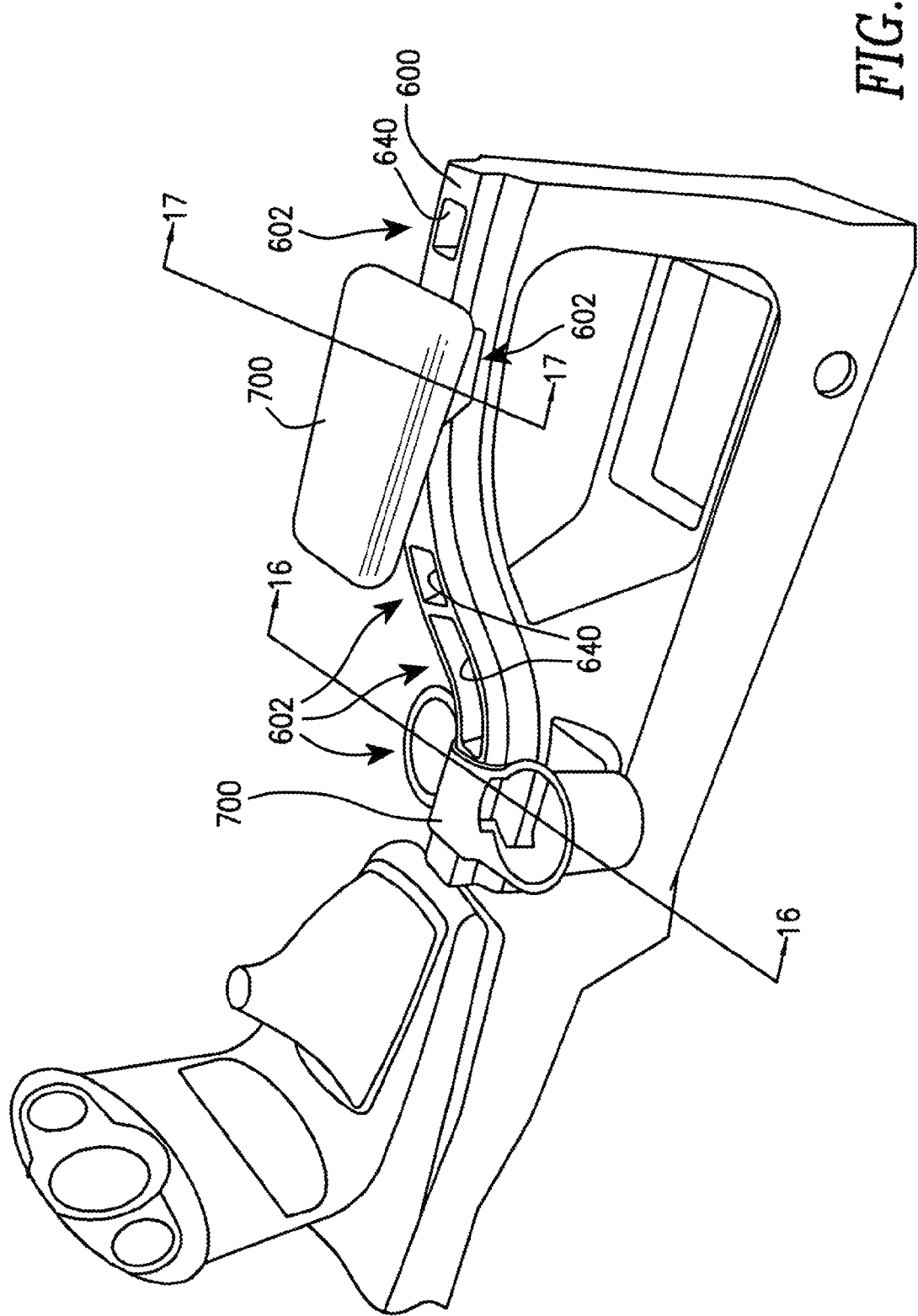
FIG. 4A is a perspective view of an alternate console apparatus in accordance with at least one further aspect of the present invention.
Figure 4B:
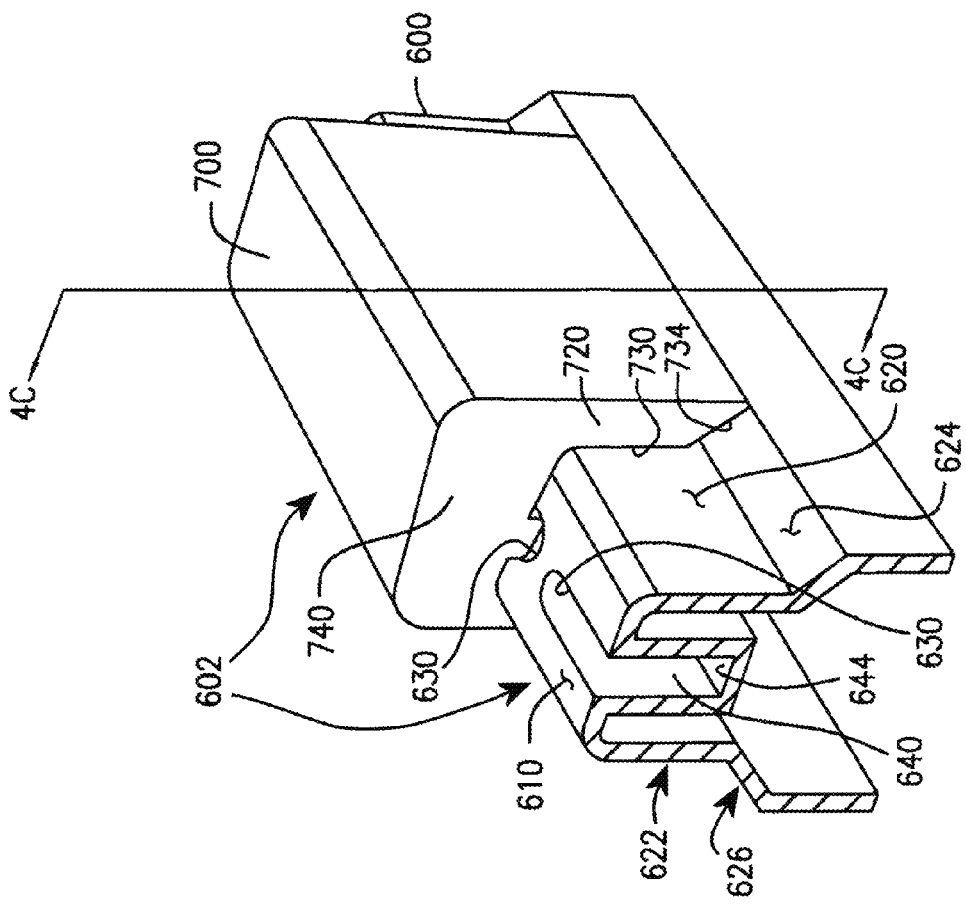
FIG. 4B is a close-up perspective view of a connection mechanism between the spine member and the accessory module of FIG. 4A.

Reference is now made to FIGS. 4A and 4B. FIG. 4A is a perspective view of a third embodiment of the console apparatus 10 integrated with a vehicle console in accordance with at least one further aspect of the present invention. FIG. 4B is a close-up perspective view of a connection mechanism between the spine member 600 and the accessory module 700 of FIG. 4A. The console apparatus 10 includes a spine member 600 having an upper surface 610 and multiple receptacles 640 located at different positions 602 along the spine member 600. The receptacles 640 have corresponding apertures 630 where the perimeter of the apertures 630 is curvilinear. The console apparatus 10 further includes an accessory module 700 having a central protrusion 710, sidewalls 720 and an accessory portion 740. In this embodiment, the accessory portion 740 is an armrest. The at least one accessory module 700 can be snugly held in place on the spine member 600 by utilizing the: sidewalls 720 shaped and sized to conform to the spine member 600; and the protrusion 710 that is shaped and sized to engage the receptacle 640.

Figure 4C:
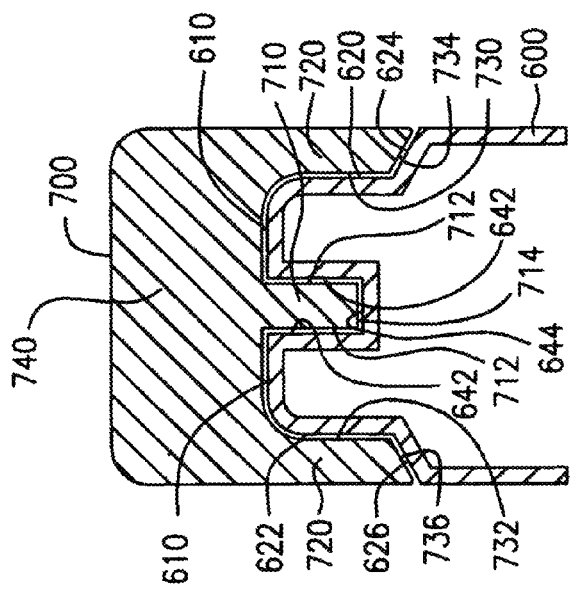
FIG. 4C is a cross-sectional view taken through line 4C-4C of the apparatus of FIG. 4B.

Reference is now made to FIGS. 4B and 4C, where FIG. 4C is a cross-sectional view taken through line 4C-4C of the apparatus of FIG. 4B. The receptacle 640 includes an interior side wall surface 642 and an interior bottom surface 644. The spine member 600 includes first and second opposing side surfaces 620 and 622 extending transversely from the upper surface 610, and third and fourth opposing side surfaces 624 and 626 extending transversely from the first and second opposing side surfaces 620 and 622, respectively.

The protrusion 710, which extends downwardly from the accessory module 700 between the sidewalls 720, includes an exterior side surface 712 and an exterior bottom surface 714. The sidewalls 720 together include first and second inwardly opposing side surfaces 730 and 732 that are sized and shaped to conform to the upper surface 610 and the first and second opposing side surfaces 620 and 622 of the spine member 600. The sidewalls 720 further include third and fourth opposing side surfaces 734 and 736 extending transversely from the first and second inwardly opposing side surfaces 730 and 732, respectively, that are sized and shaped to conform to the third and fourth opposing side surfaces 624 and 626 of the spine member 600.

The accessory module 700 is connected to the spine member 600 at any of the plurality of positions 602 by placing the module 700 over the spine member 600, while inserting the protrusion 710 into one of the receptacles 640, and applying downward pressure to push the sidewalls 720 around the spine member 600 and the protrusion 710 into the receptacle 640. In the connected orientation, the first and second inwardly opposing side surfaces 730 and 732, and the third and fourth opposing side surfaces 734 and 736, are in direct contact with the corresponding upper surface 610, and first, second, third and fourth opposing side surfaces 620, 622, 624 and 626, creating a tight and snug fit. Additionally, in the connected orientation, the exterior side surface 712 and the exterior bottom surface 714 are in direct contact with the corresponding interior side wall surface 642 and interior bottom surface 644 of the receptacle 640 creating a tight and snug fit. Removal of the accessory module 700 from the spine member 600 is similar to that discussed previously.

Figure 16:
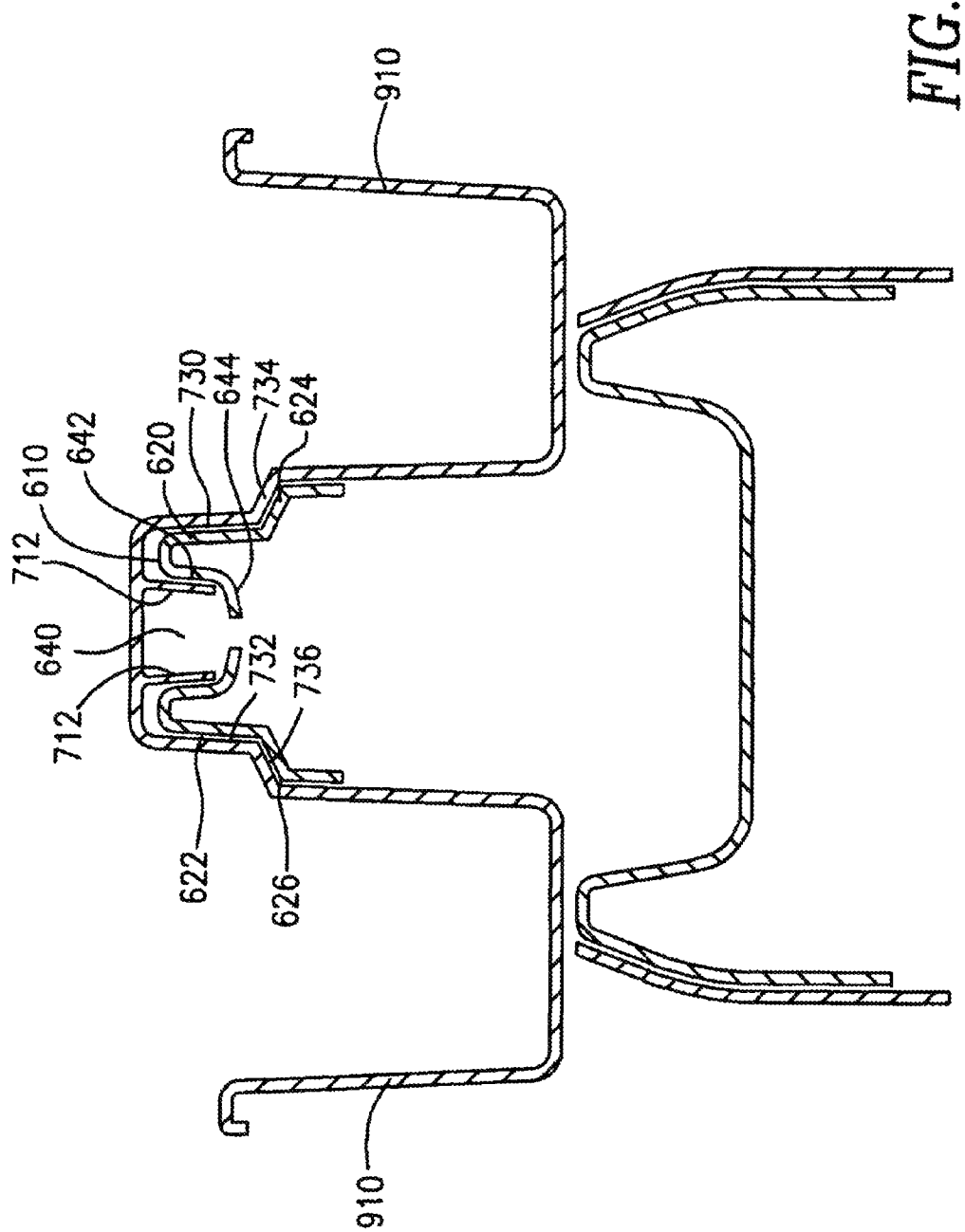
FIG. 16 is a cross-sectional view taken through line 16-16 of the spine member and dual cup-holder accessory module of FIG. 4A.

In another embodiment, the receptacle 640 has only the interior side wall surface 642 and no interior bottom surface 644. It is also contemplated that the protrusion 710 has only the side surface 712 and no exterior bottom surface 714 (as depicted in FIG. 16). In this embodiment the side surface 712 of the protrusion 710 is sized and shaped to fit into the receptacle 640 and directly contact the interior side wall surface 642 creating a tight and snug fit.

Referring again to FIG. 4A, the console apparatus 10 may have an open bottom 150 and various accessory modules 700 including a dual cup-holder 910 and an armrest 920. As shown, the console apparatus 10 is depicted to arch downward towards the base of the gear shift knob 120 so as to reduce any obstruction to the gear shift knob 120 by a user. The spine member 600 is arched which operates to provide a suitable height for an armrest accessory module 920 or other accessory module 700 to be used.

As depicted above in FIGS. 4A and 4B the transitions between, and/or orientations of, the upper surface 610, first, second, third and fourth opposing side surfaces 620, 622, 624 and 626 of the spine member 600 are defined by a number of angles. It is also contemplated that the transitions can be smooth or rounded as depicted in FIGS. 5A-5C.

Figure 5A:
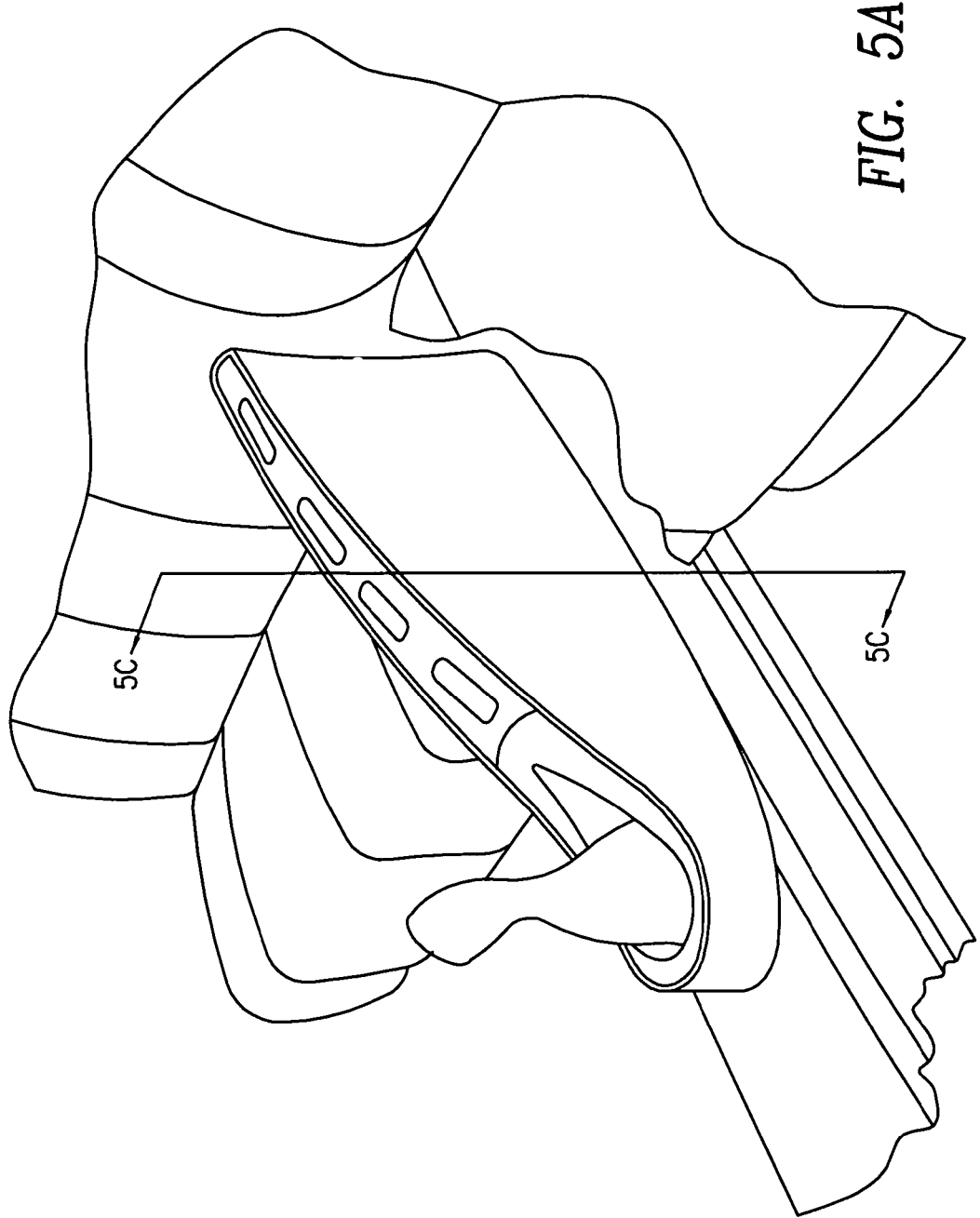
FIG. 5A is a perspective view of an alternative console apparatus in accordance with at least one further aspect of the present invention.
Figure 5B:
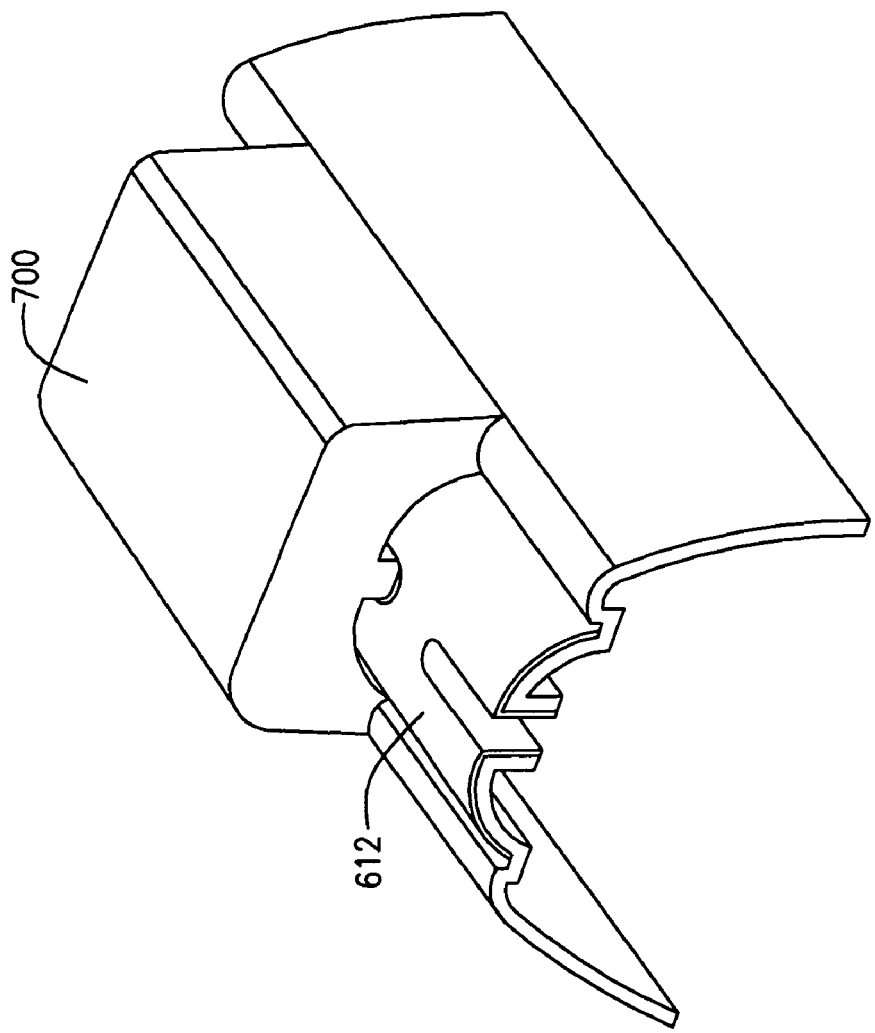
FIG. 5B is a close-up perspective view of a connection mechanism between the spine member and the accessory module of FIG. 5A.
Figure 5C:
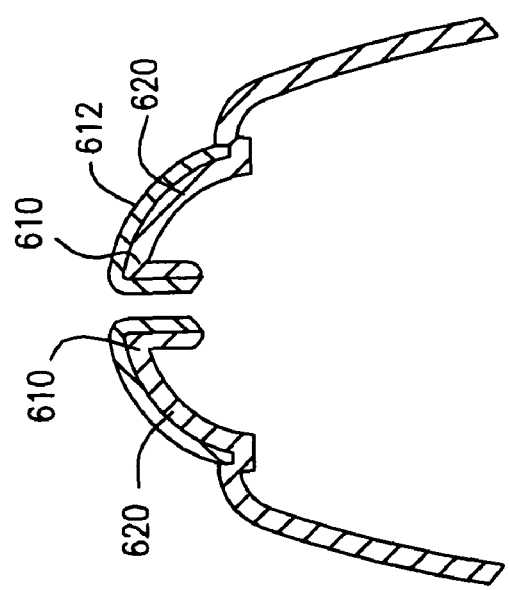
FIG. 5C is a cross-sectional view taken through line 5C-5C of the apparatus of FIG. 5B.

FIG. 5A is a perspective view of an alternative console apparatus in accordance with at least one further aspect of the present invention, FIG. 5B is a close-up perspective view of a connection mechanism between the spine member 600 and the accessory module 700 of FIG. 5A, and FIG. 5C is a cross-sectional view taken through line 5C-5C of the apparatus of FIG. 5B. The upper surface 610 smoothly transitions to the first and second opposing side surfaces 620 and 622. The corresponding first and second inwardly opposing side surfaces 730 and 732 are shaped and sized to conform to the smooth transition. The spine member 600 may be covered with a covering/trim 612 made of one or more materials known to a skilled artisan, including but not limited to leather, fabric, rubber, silicone, plastic, plastic resin or other synthetic flexible material. It is contemplated that the covering/trim 612 may have a tacky-like or non-slip surface so as to improve the connection between the accessory module 700 and the spine member 600.

Any of the above-described console apparatus 10 may be further secured by one or more fastening mechanisms. The fastening mechanisms may include one or more of: a push-nut assembly, a screw assembly such as a quarter turn screw, a tether assembly, a snap closure assembly, a buckle assembly, an adjustable post assembly, or other suitable assembly known to a skilled artisan. The fastening mechanism functions to secure the accessory module 300 to the spine member 200 to resist inadvertent disengagement of the accessory module 300 from the spine member 200. The fastening mechanisms described herein can quickly and easily be fastened and unfastened. The fastening mechanism is resistant to inadvertent unfastening by the jostling and movements of the vehicle and the user.

Figure 6:
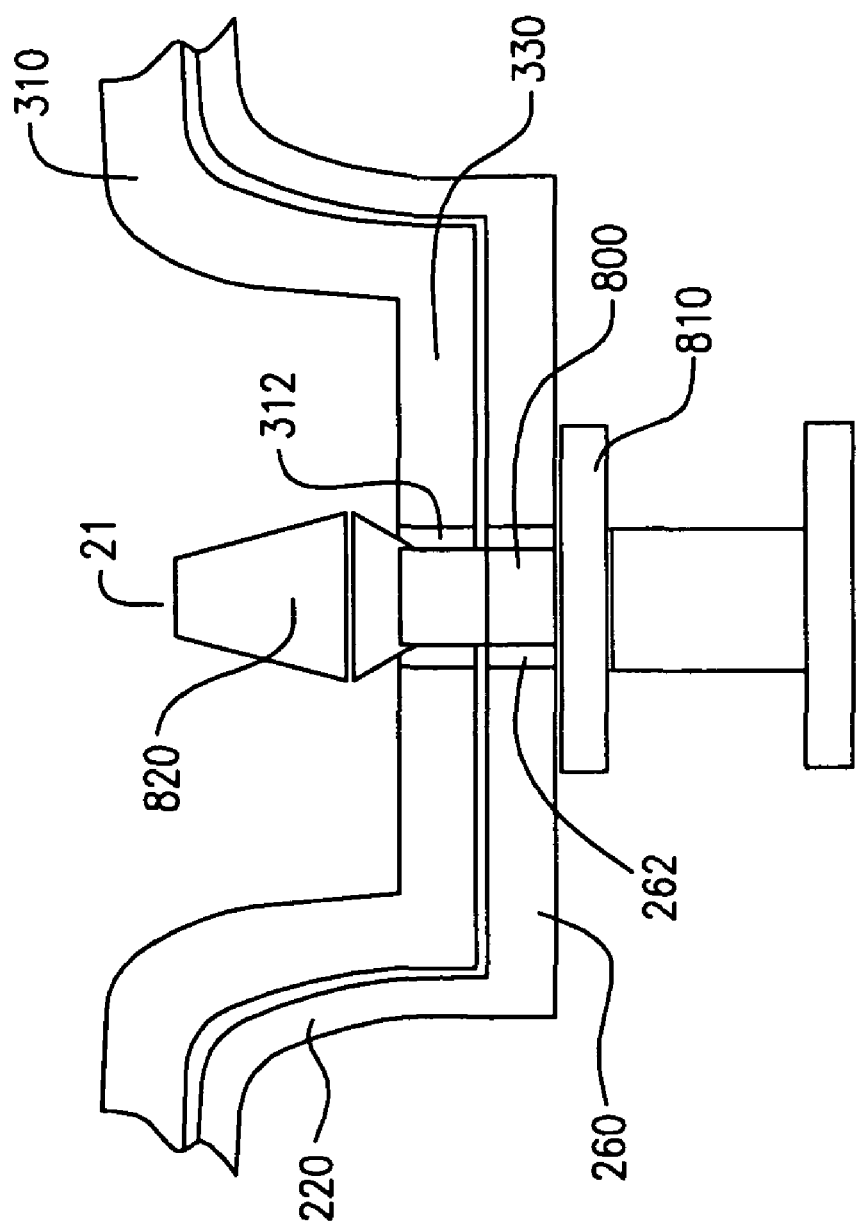
FIG. 6 is a cross-sectional view of an embodiment of the connection mechanism between a spine member and an accessory module in accordance with at least one aspect of the present invention.

As shown in FIG. 6, one such fastening mechanism includes a push-nut assembly 21. The push-nut assembly 21 includes a shaft 800 which further includes a flexible first stop member 820 and a second stop member 810. The exterior bottom surface 330 of the protrusion 310 includes a fastening aperture 312, and the interior bottom surface 260 of the receptacle 220 includes a corresponding fastening aperture 262. The shaft 800 and the flexible first stop member 820 are sized to fit through the fastening apertures 312 and 262, while the second stop member 810 cannot. The flexible first stop member 820 fits through the apertures 312 and 262 by way of being temporarily deformed. A moderate pushing force is applied to temporarily deform the flexible first stop member 820. The second stop member 810 and flexible first stop member 820 are situated on the shaft 800 such that, as the flexible first stop member 820 is forced through the fastening apertures 312 and 262, the second stop member 810 will prevent the shaft 800 from traveling completely through. The distance between the flexible first stop member 820 and the second stop member 810 along the shaft 800 is adjusted so that a tight and snug fit between the exterior bottom surface 330 of the protrusion 310 and the interior bottom surface 260 of the receptacle 220 is maintained. Such a fastening mechanism functions to secure the accessory module 300 to the spine member 200 and prevent inadvertent disengagement.

FIGS. 7A-7B depict an alternative fastening mechanism employing a tether assembly 22, where FIG. 7A is a perspective view of the spine member 200 and FIG. 7B is a cross-sectional view taken through line 7B-7B of the spine member 200 of FIG. 7A. In this embodiment, the accessory module (not shown) further includes a flexible tether 830 having a flexible push member 832 and the spine member includes apertures 834. The flexible push member 832 will not fit through one of the apertures 834 unless it is temporarily deformed. A moderate pushing force is applied to temporarily deform the flexible push member 832. When the accessory module 300 is connected to the spine member 200 in the tight and snug fit orientation, a user pushes the flexible push member 832 to engage the corresponding aperture 834 on the spine member 200.

FIGS. 8A-8B depict a further alternative fastening mechanism employing a snap closure assembly 23. The spine member 200 includes one or more apertures 844 and the accessory module 300 includes a snap member 840 and a stop member 842 that is sized and shaped to engage one or more of the apertures 844. FIG. 8B is a cross-sectional view taken through line 8B-8B of the apparatus of FIG. 8A. In this embodiment, the snap member 840 is integrated with the accessory module 300. Once the accessory module 300 is connected to the spine member 200 in the tight and snug fit orientation, a user pushes and adjusts the snap member 840 so that the stop member 842 engages the corresponding aperture 844 on the spine member 200 and functions to hold the accessory module 300 to the spine member 200 in the tight and snug fit orientation.

Figure 9:
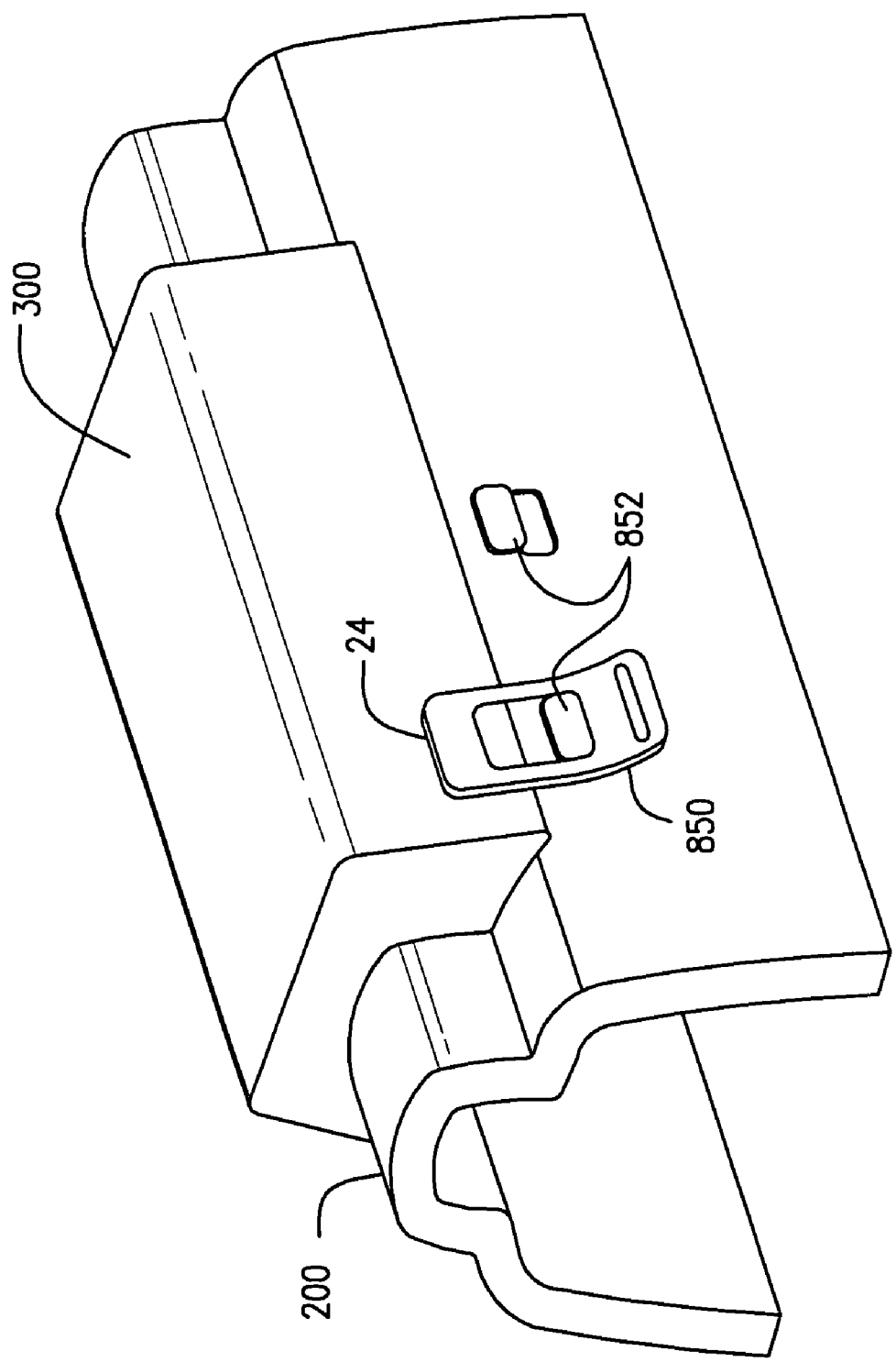
FIG. 9 is a perspective view of an alternative console apparatus having a buckle fastening assembly in accordance with at least one further aspect of the present invention.

FIG. 9 depicts a further fastening mechanism employing a buckle assembly 24. The spine member 200 includes prongs 852 and the accessory module 300 includes a buckle member 850 that is sized and shaped to receive one or more of the prongs 852. In this embodiment, the buckle member 850 is integrated with the accessory module 300. Once the accessory module 300 is connected to the spine member 200 in the tight and snug fit orientation, a user pushes the buckle member 850 over the corresponding prong 852 so that the prong 852 snugly engages the buckle member 850 on the spine member 200 and functions to lock the accessory module 300 to the spine member 200 in the tight and snug fit orientation.

Figure 10:
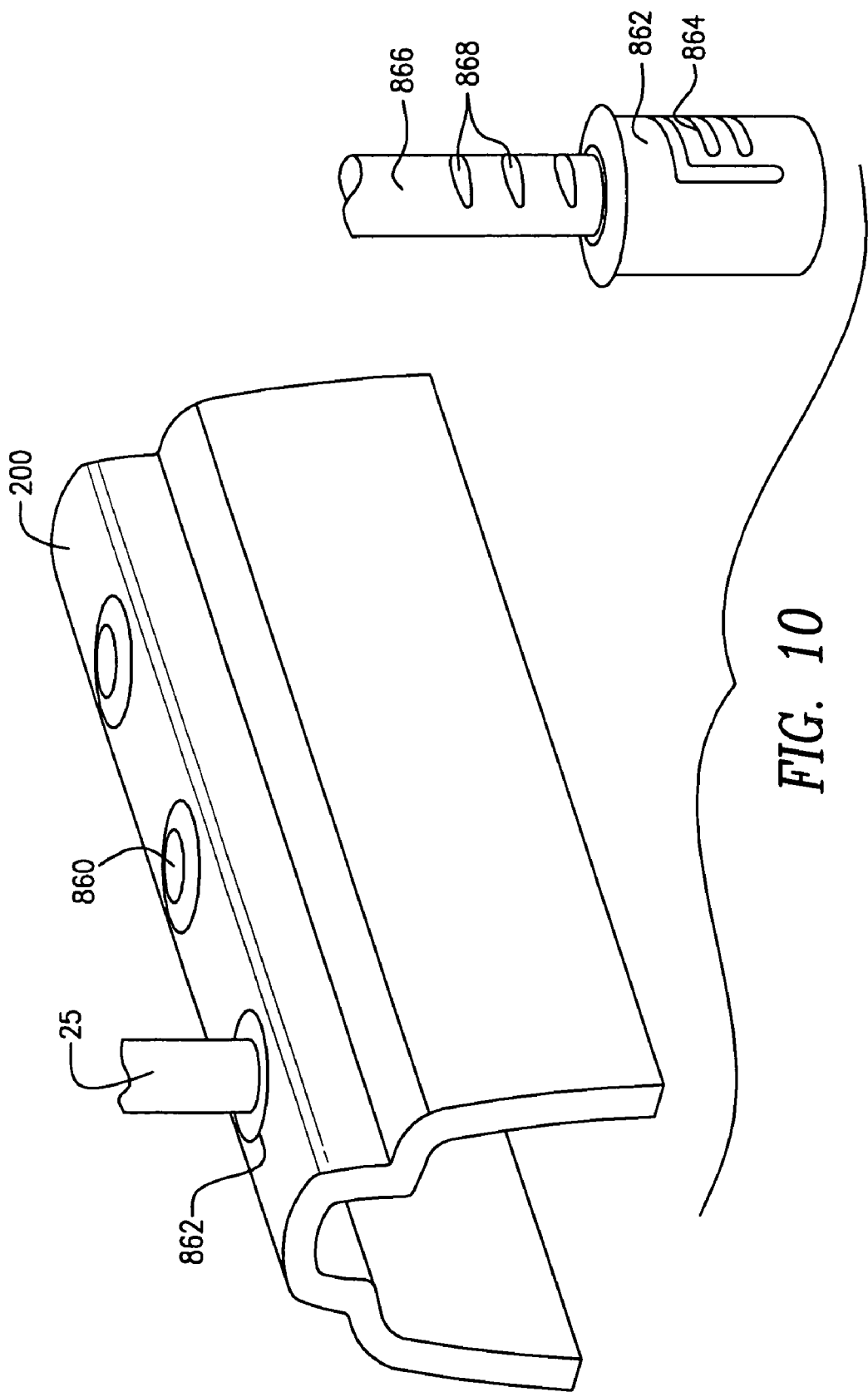
FIG. 10 is a perspective view of an alternative spine member having an adjustable post fastening assembly in accordance with at least one further aspect of the present invention.

FIGS. 10A-10B depict yet another fastening mechanism employing an adjustable post assembly 25. The spine member 200 includes the adjustable post assembly 25, best seen in FIG. 10B. The spine member 200 includes one or more apertures 860 in which a post clip 862 having a stop piece 864 is disposed. The accessory module (not shown) includes a post 866 that is sized and shaped to engage the post clip 862. The post 866 further includes at least two spaced apart post grooves 868 that are sized and shaped to engage the stop piece 864. The accessory module is connected to the spine member 200 by placing the post 866 in an orientation such that the post 866 engages the post clip 862 on the spine member 200, and providing a downward force until the desired post groove 868 engages and is tightly held in place by the stop piece 864. The post 866 is tightly held in place and functions to lock the accessory module 300 to the spine member 200 in the tight and snug fit orientation.

The accessory modules 300, 500, 505 and 700 according to the embodiments discussed above include respective accessory portions 340, 540, 545 and 740 that are designed to perform at least one desired function, and in some instances may perform multiple functions. For example, the accessory portion 340, 540, 545 or 740 may include, for example, a cup-holder, a storage compartment with or without a lid, a saddle bag, an armrest, an electrical connection, a signal connection and a docking station for electronic devices. It is contemplated that one or more accessory modules 300, 500, 505 or 700 can be attached to the spine member 200, 400, 415 or 600 and function to provide the user with a wide range of choices as to the combination of accessory modules 300, 500, 505 or 700 and their placement on the spine member 200, 400, 415 or 600. It is also contemplated that the accessory modules 300, 500, 505 or 700 may be designed so that when they are connected to the spine member 200, 400, 415 or 600, the adjacently attached accessory modules 300, 500, 505 or 700 could be integrated and made to appear as one continuous accessory module.

Figure 11:
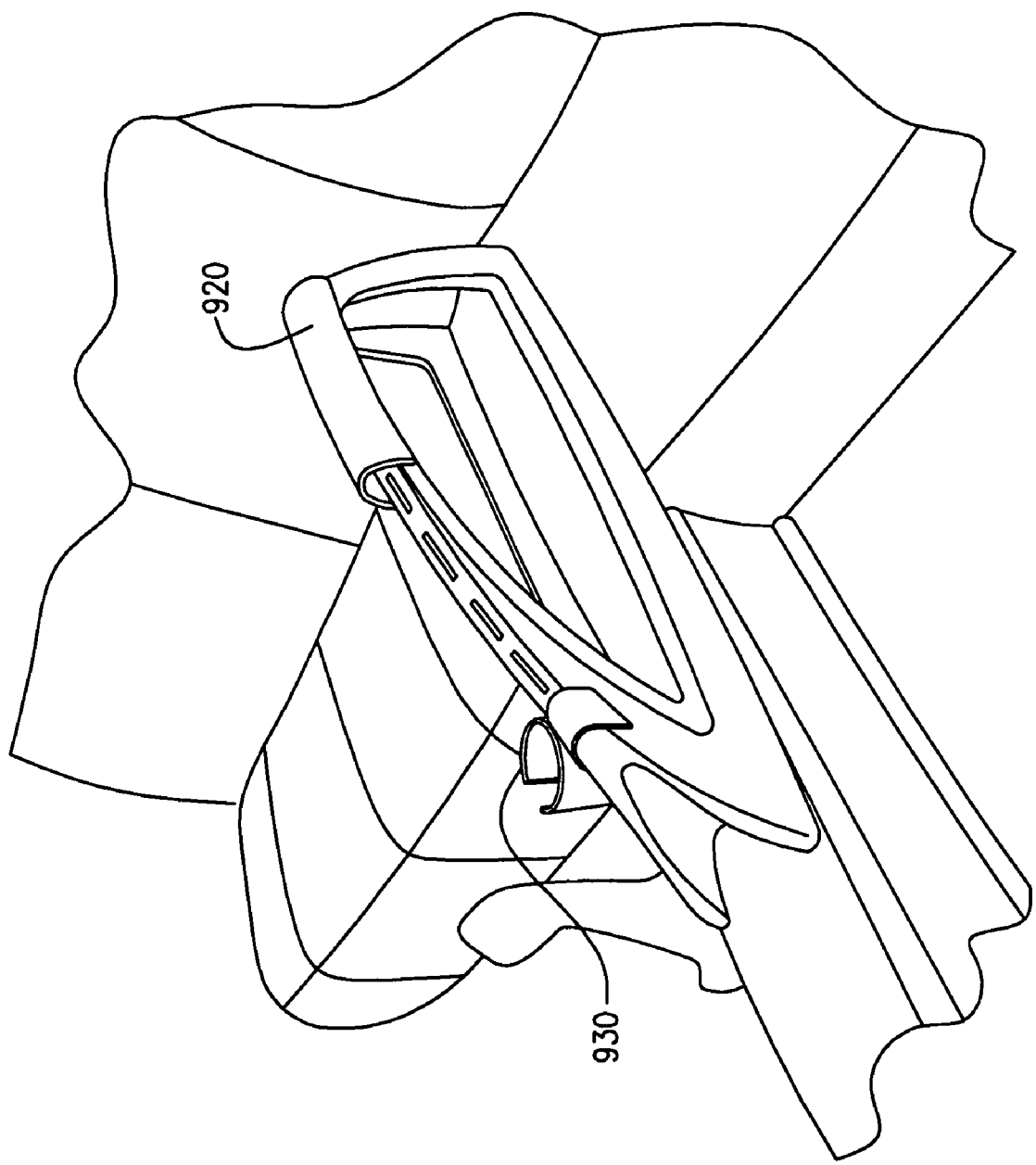
FIG. 11 is a perspective view of a console apparatus with an open bottom, a mono cup-holder and an armrest.
Figure 12:
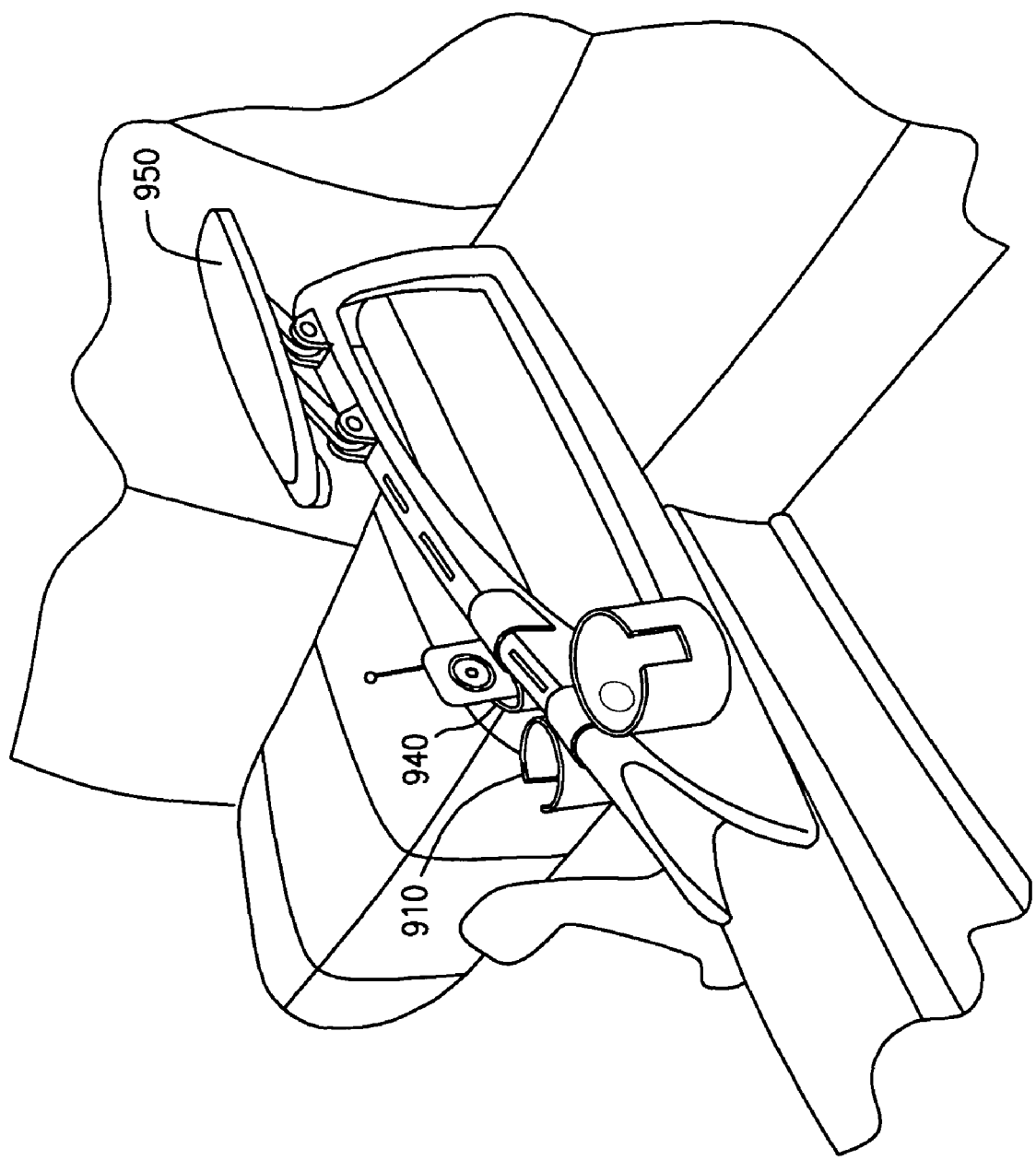
FIG. 12 is a perspective view of a console apparatus with a soft storage container, a dual cup-holder, an adjustable armrest and an electrical connection.
Figure 13:
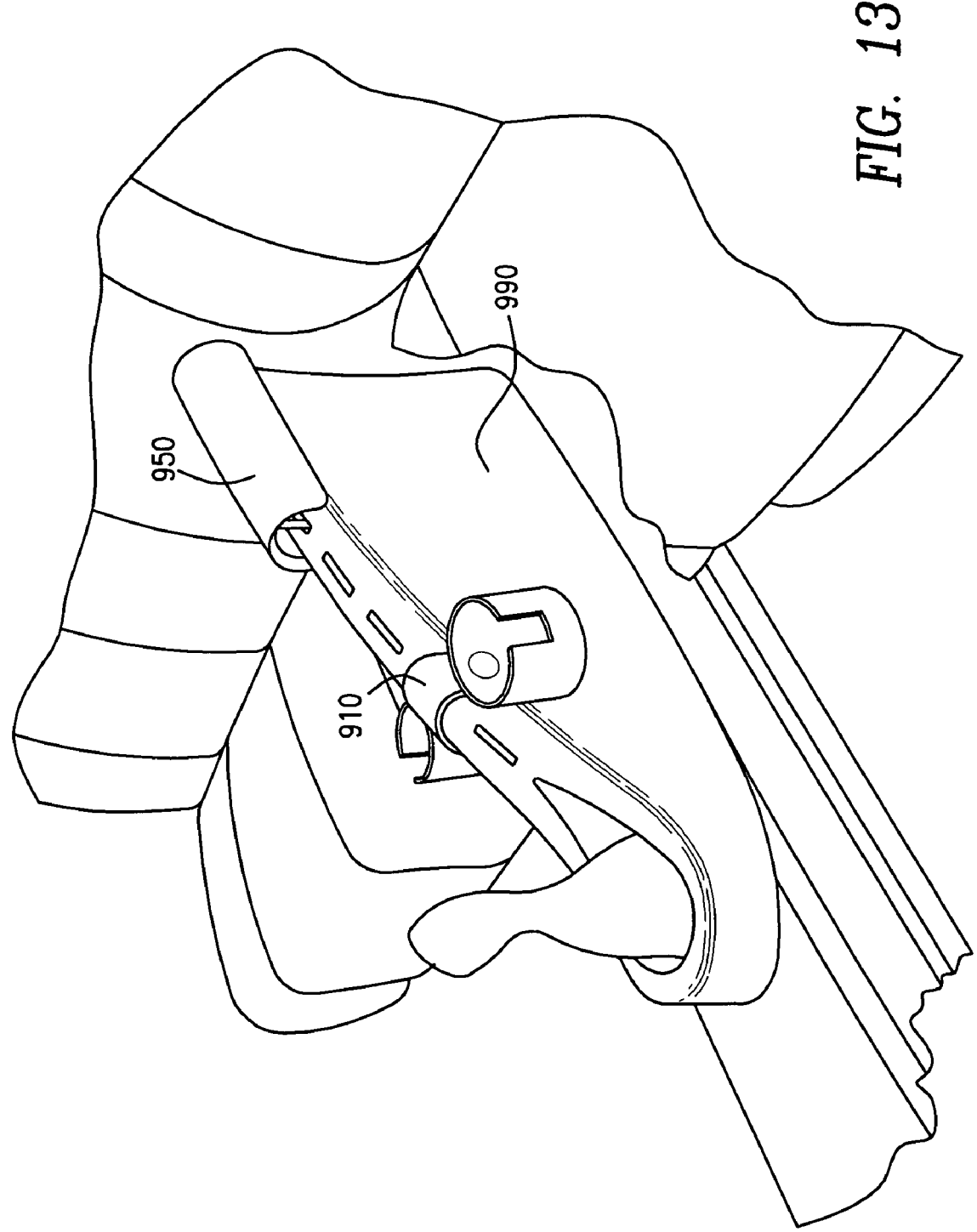
FIG. 13 is a perspective view of a console apparatus that is integral with the gear shift knob housing with a dual cup-holder, and armrest and solid side surfaces.

FIGS. 11-15 depict various embodiments where different accessory modules 300, 500, 505 or 700 are connected to the spine member 200, 400, 415 or 600. As shown, the type and placement of the accessory modules 300, 500, 505 or 700 on the spine member 200, 400, 415 or 600 is dependent upon the user's (or manufacturer's) preferences. For example, FIG. 11 depicts a console apparatus 10 that includes a mono cup-holder 930 and a fold-over armrest 950. Referring to FIG. 12, the console apparatus 10 includes a dual cup-holder 910, a storage compartment including an electrical outlet and/or signal connection 940 and an adjustable armrest 920. As shown in FIG. 13, the console apparatus 10 has solid side surfaces 990 and includes a dual cup-holder 910 and a fold-over armrest 950.

Figure 14:
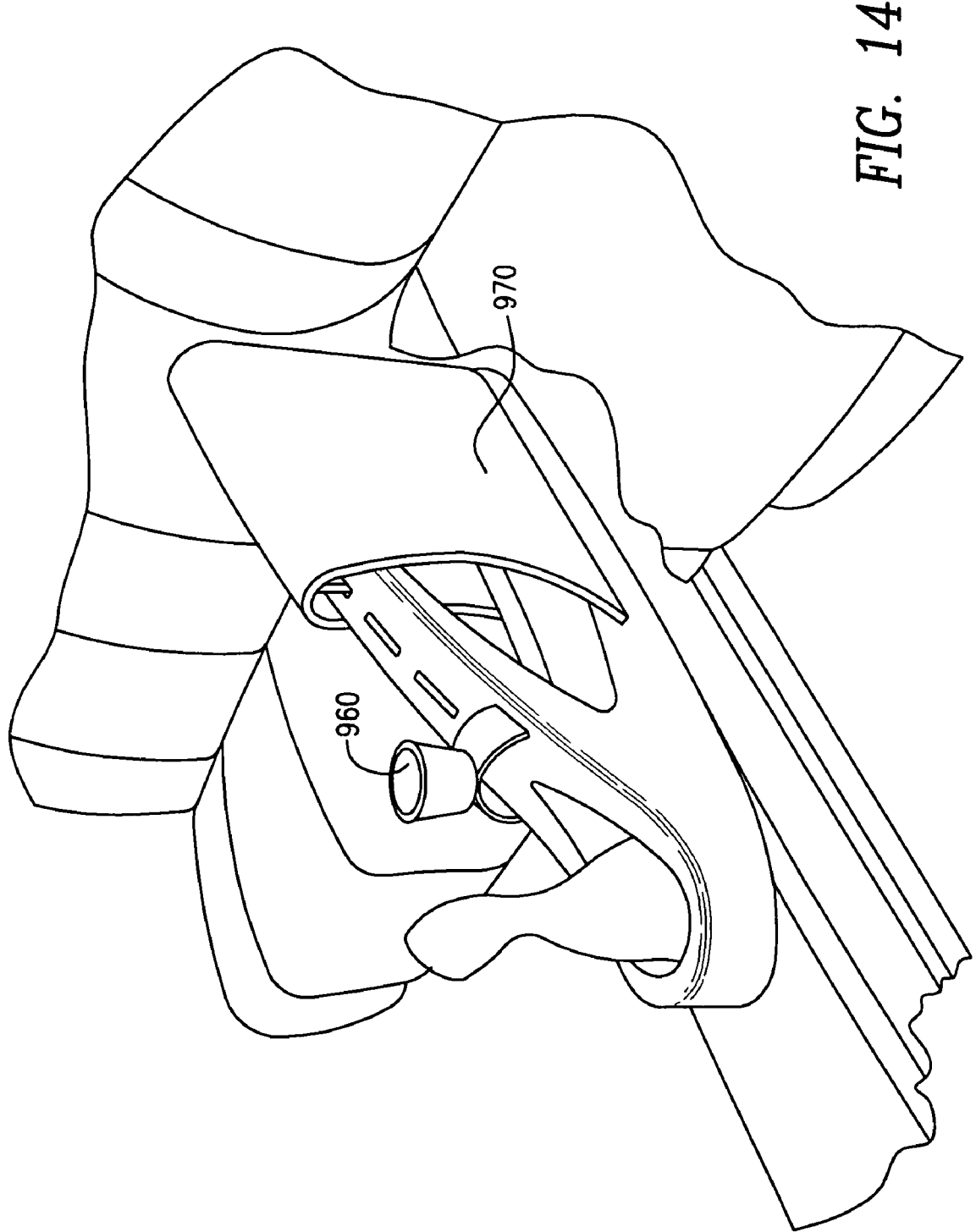
FIG. 14 is a perspective view of a console apparatus that is integral with the gear shift knob housing with a mono cup-holder, an armrest/saddle bag, and an open bottom.

FIG. 14 depicts the console apparatus 10 having a mono cup-holder 960 and a multi-functional fold-over armrest and saddle bag module 970. The mono cup-holder 960 as shown in FIG. 14 differs from the mono cup-holder 930 shown in FIG. 11 as to the orientation of the accessory portion 340 relative to the spine member 200. It is contemplated the accessory portion 340 may be oriented above, to the side, below, or a combination thereof relative to the spine member 200.

Figure 15:
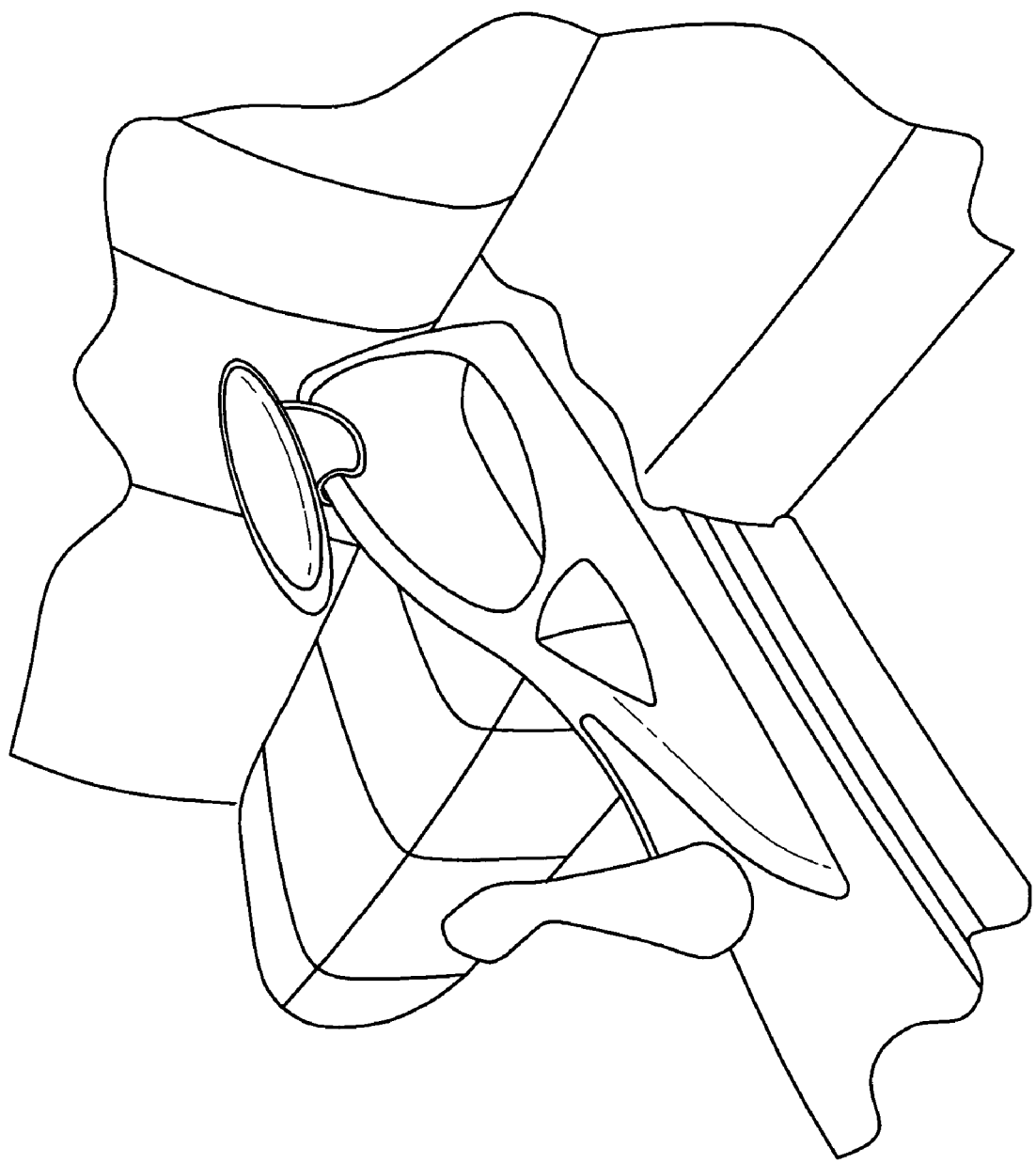
FIG. 15 is a perspective view of a console apparatus where the spine member is curvilinear, an armrest, and fixed open compartments.

Referring to FIG. 15, a raised armrest 980 is oriented above the spine member 200. As shown, the spine member 200 is curvilinear in the longitudinal direction and functions to provide improved storage space and aesthetics.

Figure 17:
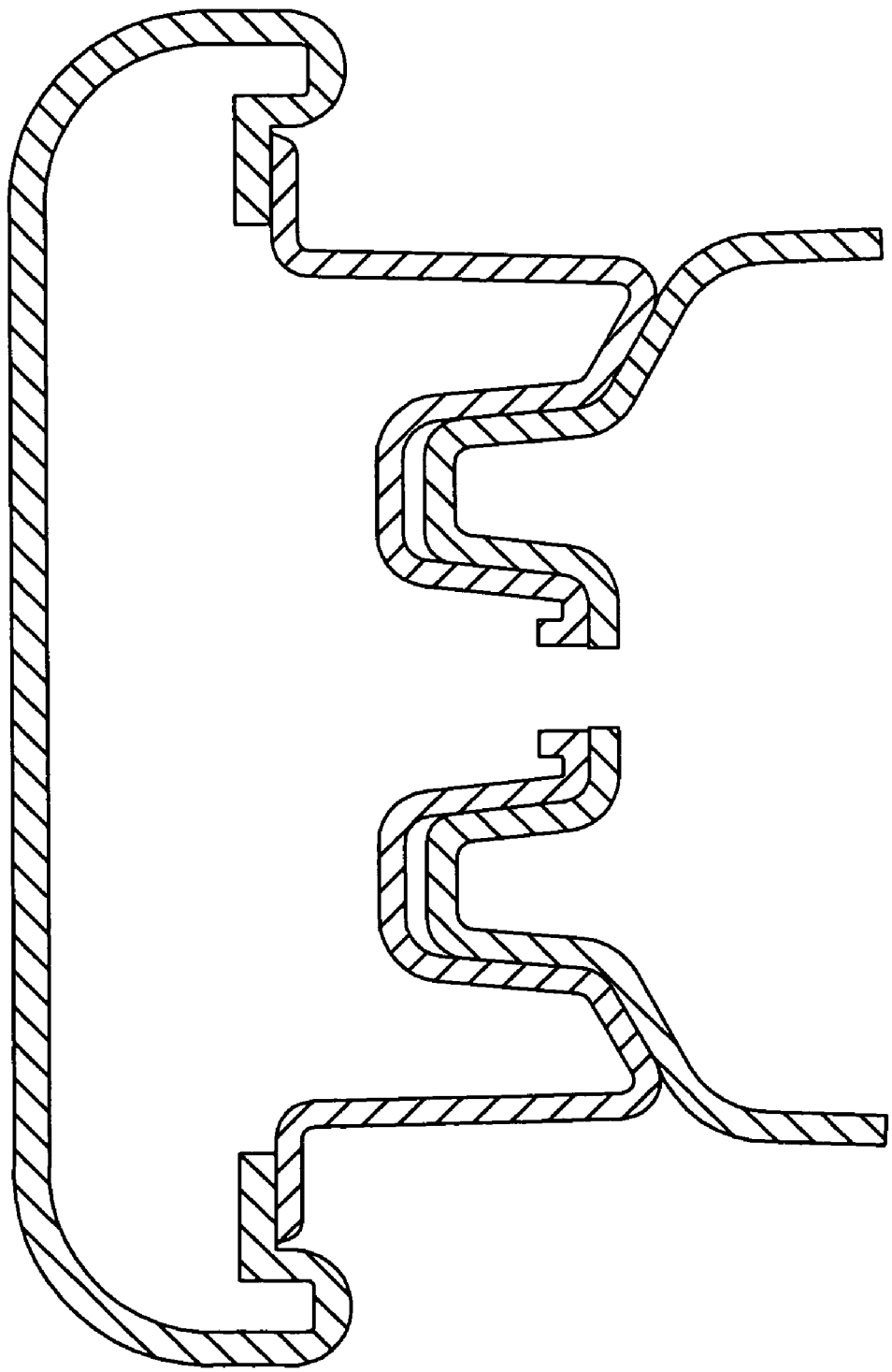
FIG. 17 is a cross-sectional view taken through line 17-17 of the spine member and armrest accessory module of FIG. 4A.
Figure 18:
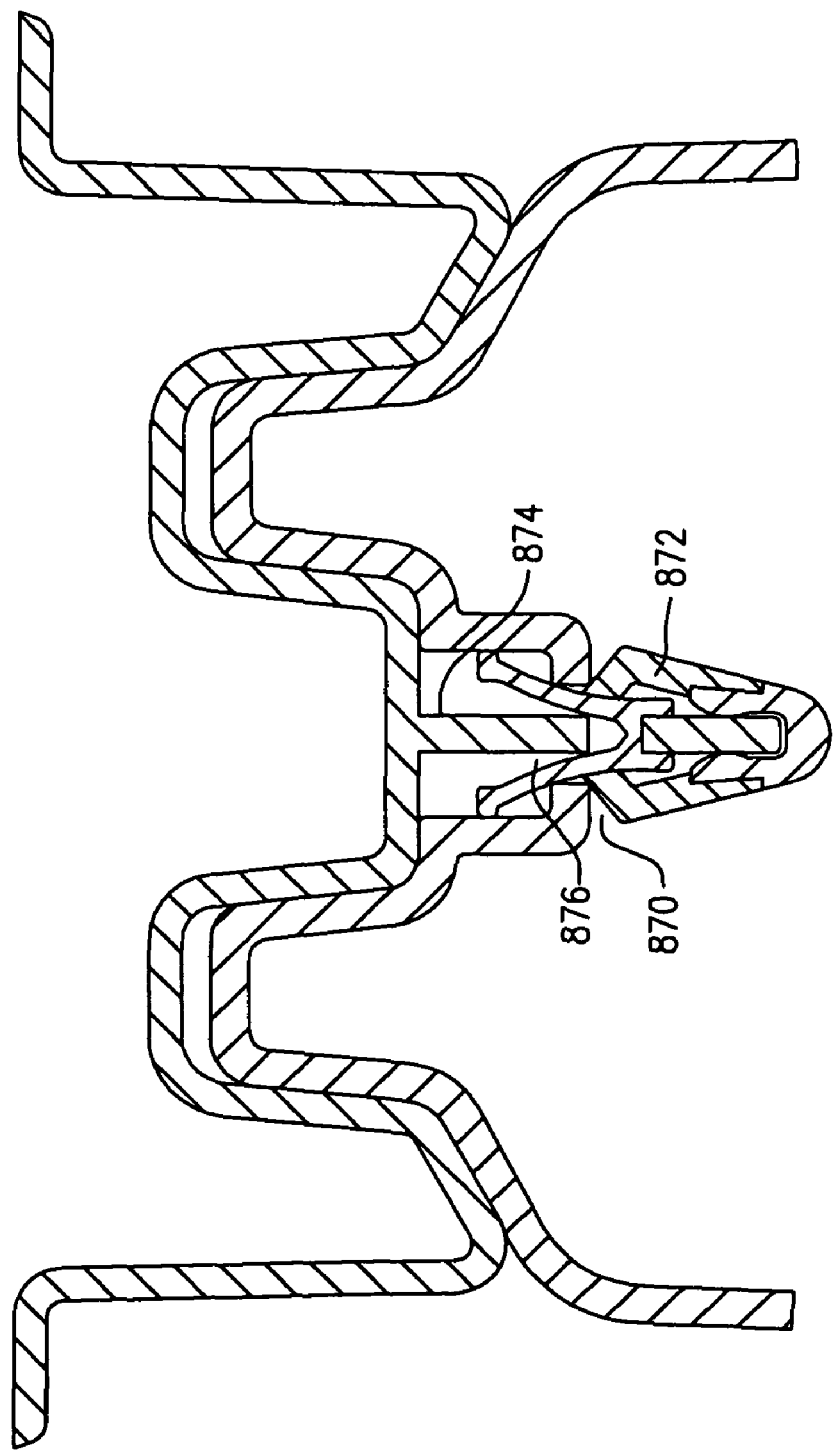
FIG. 18 is a cross-sectional view taken through line 17-17 of the spine member and armrest accessory module of FIG. 4A.

FIGS. 16-18 depict cross-sectional views of the apparatus of FIG. 4A showing the tight and snug fit orientation of an accessory module 700 connected to the spine member 600. FIG. 16 is a cross-sectional view taken through line 16-16 of the apparatus 10 of FIG. 4A where an accessory module 700 (i.e., a dual cup-holder accessory module 910) is connected to the spine member 600. In this configuration, the protrusion 710 having only the exterior side wall surface 712 is in a snug conformation with the interior side wall surface 642 of the receptacle 640, and the cavity 720 where the first and second inwardly opposing side surfaces 730 and 732, and the third and fourth opposing side surfaces 734 and 736, are in direct contact with the upper surface 610, and the first, second, third and fourth opposing side surfaces 620, 622, 624 and 626. The interior bottom surface 644 of the receptacle 640 is not in contact with the protrusion 710.

FIG. 17 is a cross-sectional view taken through line of the apparatus 10 of FIG. 4A where an accessory module 700 (i.e., an armrest accessory module 950) is connected to the spine member 600. The accessory module 700 is further secured to the spine member 600 by engaging the fastening apertures with a fastening mechanism including, but not limited, to the push-nut assembly 21 as discussed above, a 0.25 turn screw clip or the like.

FIG. 18 is a cross-sectional view taken through line of the apparatus 10 of FIG. 4A where an accessory module 700 (i.e., an armrest accessory module 950) is connected to the spine member 600 by a fastening mechanism employing a clip attachment assembly 870. The clip attachment assembly 870 includes at least one non integrated flexible snap-fit clip 872 that is attached to an appendage 874 extending from the exterior bottom surface 714 of the protrusion 710 of the accessory module 700. To attach the accessory module 700 to the spine 600, the accessory module 700 is placed over the receptacle 640 so that the flexible snap-fit clip 872 engages and fits through a clip aperture 876 by way of being temporarily deformed when a moderate pushing force is applied to temporarily deform the flexible snap-fit clip 872. The flexible snap-fit clip 872, in its normal formation, creates a tight and snug interface conformation. Such a fastening mechanism functions to secure the accessory module 700 to the spine member 600 and prevent inadvertent disengagement. To disengage the flexible snap-fit clip 872 from the clip aperture 876, a user would lift the accessory module 700 with appropriate force to temporarily deform the flexible snap-fit clip 872 so that it fits through the clip aperture 876 and can be lifted away.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A vehicle interior console apparatus (10), comprising:
a spine member (600) including an upper surface (610), a first side surface (620) extending from said upper surface (610), and a second side surface (622) extending from said upper surface (610) and located opposite said first side surface (620); and
at least one user accessory module (700) that connects to said spine member (600) at any of a plurality of positions (602), said at least one user accessory module (700) including a cavity (720), said cavity (720) having a first inwardly side surface (730) and a second inwardly side surface (732) opposing said first inwardly side surface (730);
wherein said at least one user accessory module (700) connects to said spine member (600) such that said cavity (720) of said at least one user accessory module (700) is placed over and around said spine member (600), and said first inwardly side surface (730) makes direct contact with said first side surface (620) and said second inwardly side surface (732) makes direct contact with said second side surface (622).

2. The vehicle interior console apparatus (10) set forth in claim 1, wherein said spine member (600) includes a third side surface (624) extending from said first side surface (620) and includes a fourth side surface (626) extending from said second side surface (622) and located opposite said third side surface (624), said cavity (720) having a third side surface (734) extending from said first inwardly side surface (730) and having a fourth side surface (736) extending from said second inwardly side surface (732) and opposing said third side surface (734), wherein said at least one user accessory module (700) connects to said spine member (600) such that said third side surface (734) makes contact with said third side surface (624) and said fourth side surface (736) makes contact with said fourth side surface (626).

3. The vehicle interior console apparatus (10) set forth in claim 2, wherein said third and fourth side surfaces (734, 736) of said cavity are at least partially inwardly directed toward each other.

4. The vehicle interior console apparatus (10) set forth in claim 1, further comprising an open bottom.

5. The vehicle interior console apparatus (10) set forth in claim 1, wherein said spine member (600) wraps around a gear shift knob.

6. The vehicle interior console apparatus (10) set forth in claim 1, wherein said upper surface (610) is flat.

7. The vehicle interior console apparatus (10) set forth in claim 1, wherein said upper surface (610) is rounded.

8. The vehicle interior console apparatus (10) set forth in claim 1, wherein said spine member (600) is arched in a longitudinal direction.

9. The vehicle interior console apparatus (10) set forth in claim 1, wherein said at least one user accessory module (700) is a dual cup-holder (910).

10. The vehicle interior console apparatus (10) set forth in claim 1, further comprising a plurality of receptacles (640) disposed in spaced apart relation along said spine member (600) in a longitudinal direction, wherein said at least one user accessory module (700) includes at least one protrusion (710) extending therefrom and being sized and shaped for reception within at least one of said plurality of receptacles (640) when said spine member (600) and said at least one user accessory module (700) are connected.

11. The vehicle interior console apparatus (10) set forth in claim 1, wherein said spine member (600) extends in a longitudinal direction in a plane perpendicular to a substantially horizontal reference plane.

12. The vehicle interior console apparatus (10) set forth in claim 1, wherein at least one of:
said at least one user accessory module (700) is a mono cup-holder, a dual cup-holder, an open storage compartment, a lidded storage compartment, an armrest, a saddle bag, or a combination thereof; or
said at least one user accessory module (700) further comprises a power or signal connection for supplying power or electrical signals to said at least one user accessory module (700).

* * * * *